US012745026B2

(12) United States Patent
Park et al.

(10) Patent No.: US 12,745,026 B2
(45) Date of Patent: Sep. 22, 2026

(54) WEARABLE DEVICE INCLUDING SPEAKER FRAME HAVING VENT HOLE

(71) Applicants: Samsung Electronics Co., Ltd., Suwon-si (KR); EM-TECH CO., LTD., Changwon-si (KR)

(72) Inventors: Youngbae Park, Suwon-si (KR); Joonrae Cho, Suwon-si (KR); Gangtae Kim, Changwon-si (KR); Kihyun Nam, Changwon-si (KR); Dongwoo Seok, Changwon-si (KR); Jihoon Song, Suwon-si (KR); Byounghee Lee, Suwon-si (KR); Jungsoo Lee, Changwon-si (KR); Hyunwoo Jeong, Changwon-si (KR)

(73) Assignees: SAMSUNG ELECTRONICS CO., LTD., Suwon-si (KR); EM-TECH CO., LTD., Changwon-si (KR)

( * ) Notice: Subject to any disclaimer, the term of this patent is extended or adjusted under 35 U.S.C. 154(b) by 121 days.

(21) Appl. No.: 18/647,927

(22) Filed: Apr. 26, 2024

(65) Prior Publication Data

US 2024/0298100 A1 Sep. 5, 2024

Related U.S. Application Data

(63) Continuation of application No. PCT/KR2022/016852, filed on Oct. 31, 2022.

(30) Foreign Application Priority Data

Nov. 1, 2021 (KR) ........................ 10-2021-0148200
Dec. 24, 2021 (KR) ........................ 10-2021-0187830

(51) Int. Cl.

| | |
|---|---|
| ***H04R 1/02*** | (2006.01) |
| ***G04G 17/04*** | (2006.01) |
| ***G04G 21/00*** | (2010.01) |

(52) U.S. Cl.
CPC ............. *H04R 1/025* (2013.01); *G04G 17/04* (2013.01); *G04G 21/00* (2013.01);
(Continued)

(58) Field of Classification Search
CPC ................ H04R 1/025; H04R 2201/02; H04R 2499/11; H04R 2499/15; H04R 1/02;
(Continued)

(56) References Cited

U.S. PATENT DOCUMENTS 4,920,564 A * 4/1990 Allkins .................. H04M 1/03 381/189
5,729,605 A * 3/1998 Bobisuthi ............ H04R 1/1041 379/433.02

(Continued)

FOREIGN PATENT DOCUMENTS

JP 2008271425 A 11/2008
KR 20090013908 A 2/2009

(Continued)

OTHER PUBLICATIONS

International Search Report for PCT/KR2022/016852 mailed Feb. 9, 2023, 5 pages.

(Continued)

*Primary Examiner* — Oyesola C Ojo
(74) *Attorney, Agent, or Firm* — Nixon & Vanderhye, P.C.

(57) ABSTRACT

An example wearable device includes a housing forming an inner space and including a speaker hole; a speaker assembly inside the housing; and a sound duct extending from the inner surface of the housing, in which the speaker hole is formed, to the speaker assembly. The speaker assembly includes a frame including at least one first opening, which is formed in a first surface facing the sound duct of the speaker assembly, at least one second opening, which is
(Continued)

formed in a second surface, and a frame, which includes a flow path connecting the at least one first opening and the at least one second opening; a sealing member for sealing the inner space; and a vibration plate in contact with a portion of the sealing member.

20 Claims, 17 Drawing Sheets

(52) U.S. Cl.
CPC ...... *H04R 2201/02* (2013.01); *H04R 2499/11* (2013.01); *H04R 2499/15* (2013.01)

(58) Field of Classification Search
CPC .......... H04R 1/028; H04R 1/28; G04G 17/04; G04G 21/00; H04B 2001/3861; H04B 1/385; H04M 1/18; H04M 1/026; H04M 1/05; G06F 1/1688; G06F 1/163
See application file for complete search history.

(56) References Cited

U.S. PATENT DOCUMENTS

| | | | | |
|---|---|---|---|---|
| 6,128,394 | A * | 10/2000 | Hayakawa | H04R 1/023<br>381/189 |
| 6,282,287 | B1 * | 8/2001 | Lin | H04M 1/03<br>379/433.02 |
| 7,881,490 | B2 | 2/2011 | Chiba et al. | |
| 8,437,493 | B2 | 5/2013 | Nho et al. | |
| 9,363,589 | B2 * | 6/2016 | Lippert | H04R 1/086 |
| 9,625,944 | B2 * | 4/2017 | Weber | H04M 1/18 |
| 9,832,567 | B2 | 11/2017 | Zhang et al. | |
| 9,939,783 | B2 * | 4/2018 | Hilario | G04B 37/00 |
| 10,021,800 | B1 | 7/2018 | Zhang et al. | |
| 10,231,061 | B2 | 3/2019 | Dehe et al. | |
| 10,466,047 | B2 | 11/2019 | Ehman et al. | |
| 10,469,941 | B2 | 11/2019 | Dave et al. | |
| 10,686,923 | B2 | 6/2020 | Jeon et al. | |
| 10,698,367 | B2 | 6/2020 | Park et al. | |
| 10,765,019 | B2 | 9/2020 | Werner et al. | |
| 11,012,766 | B2 | 5/2021 | Cho et al. | |
| 11,470,414 | B2 * | 10/2022 | Skovgaard | H04R 1/1075 |
| 2002/0080990 | A1 * | 6/2002 | Lin | H04R 1/1016<br>381/372 |
| 2004/0029530 | A1 * | 2/2004 | Noguchi | H04R 5/023<br>455/23 |
| 2004/0264727 | A1 * | 12/2004 | Kim | H04R 1/347<br>381/370 |
| 2009/0147981 | A1 * | 6/2009 | Blanchard | H04R 1/1075<br>381/380 |
| 2011/0116671 | A1 * | 5/2011 | Jensen | H04R 1/086<br>381/355 |
| 2014/0339012 | A1 * | 11/2014 | Richardson | H04B 1/3888<br>181/202 |
| 2015/0163572 | A1 * | 6/2015 | Weiss | H04R 1/02<br>381/337 |
| 2017/0051769 | A1 * | 2/2017 | Hilario | G04G 17/08 |
| 2017/0180850 | A1 | 6/2017 | Hsu et al. | |
| 2018/0084324 | A1 * | 3/2018 | Vitt | H04R 9/025 |
| 2019/0072903 | A1 * | 3/2019 | Park | G04G 17/02 |
| 2020/0068284 | A1 * | 2/2020 | Igarashi | H04R 1/1016 |
| 2020/0073338 | A1 | 3/2020 | Liang et al. | |
| 2020/0177979 | A1 * | 6/2020 | Cho | H04M 1/0274 |
| 2021/0272546 | A1 | 9/2021 | Tisch et al. | |
| 2022/0159369 | A1 * | 5/2022 | Su | H04R 5/02 |
| 2023/0350349 | A1 | 11/2023 | Liang et al. | |

FOREIGN PATENT DOCUMENTS

| | | | |
|---|---|---|---|
| KR | 10-2019-0026461 | A | 3/2019 |
| KR | 102036752 | B1 | 10/2019 |
| KR | 10-2020-0067475 | A | 6/2020 |
| KR | 20200105896 | A | 9/2020 |

OTHER PUBLICATIONS

Written Opinion of the ISA for PCT/KR2022/016852 mailed Feb. 9, 2023, 5 pages.
Extended Search Report dated Dec. 20, 2024 in European Patent Application No. 22887750.2.
Office Action dated Jun. 4, 2026 in Korean Application No. 10-2021-0187830 with English-language translation.

* cited by examiner

WEARABLE DEVICE INCLUDING SPEAKER FRAME HAVING VENT HOLE

CROSS-REFERENCE TO RELATED APPLICATIONS

This application is a continuation of International Application No. PCT/KR2022/016852, designating the United States, filed on Oct. 31, 2022, in the Korean Intellectual Property Receiving Office and claiming priority to Korean Patent Application No. 10-2021-0148200, filed on Nov. 1, 2021, in the Korean Intellectual Property Office, and Korean Patent Application No. 10-2021-0187830, filed Dec. 24, 2021, the disclosures of each of which are incorporated by reference herein in their entireties.

BACKGROUND

Field

The disclosure relates to a wearable device including a speaker frame having a vent hole.

Description of Related Art

A wearable device may be used while being worn on a part of a user's body. The wearable device may be provided as various types of products. For example, the wearable device may be a smart watch worn on the user's wrist and capable of displaying, for example, time, weather, a user's biometric information, and messages received from an external electronic device through a display.

The wearable device may include a vent hole through which air can flow in an exterior of a housing, in order to balance internal pressure and external pressure of the housing. When a difference between the internal pressure and the external pressure of the housing occurs, the pressure difference may be resolved as external air flows into the electronic device through the vent hole or air inside the electronic device flows out of the electronic device through the vent hole.

SUMMARY

A wearable device may contact or be adjacent to the user's body when worn on a part of the user's body. When a vent hole of the wearable device is blocked by the user's body, the flow of air flowing inside and outside the wearable device may not be smooth. When the vent hole is blocked, a difference between the internal air pressure and the external pressure of the wearable device may occur, and the pressure difference may cause damage to the wearable device.

The wearable device may include a waterproof membrane disposed in the vent hole to prevent liquid from flowing into the inside through the vent hole. During pneumatic test of the wearable device, damage to the waterproof membrane disposed in the vent hole may occur. In the pneumatic test, a separate member may be required to prevent damage to the waterproof membrane. In the pneumatic test of the wearable device, a process for installing the separate member may complicate a manufacturing process and increase pneumatic test costs.

Various example embodiments of the disclosure may include a structure including an opening capable of functioning as a vent hole in a frame of a speaker assembly without forming the vent hole in the appearance thereof.

Technical problems that can be overcome according to the present disclosure are not limited to those described above, and other benefits and advantages not mentioned herein will be clearly understood from the following description.

According to an example embodiment, a wearable device may include a housing forming an internal space and including a speaker hole, a speaker assembly disposed in the housing, and an audio duct extending from an inner surface of the housing, where the speaker hole is formed, to the speaker assembly, wherein the speaker assembly may include a frame including at least one first opening formed on a first surface of surfaces of the speaker assembly, the first surface facing the audio duct, at least one second opening formed on a second surface of the surfaces, and a flow path connecting the at least one first opening and the at least one second opening, a sealing member disposed along a periphery of the frame and sealing the internal space, and a diaphragm disposed within the frame and in contact with a portion of the sealing member.

According to an example embodiment, a wearable device may include a display, a rear plate facing the display, a side bezel member disposed between the display and the rear plate and forming an internal space, a speaker hole penetrating from an outer surface of the rear plate into the internal space, a speaker assembly disposed in the internal space, and an audio duct penetrating a partition wall formed on the rear plate, and extending from the outer surface of the rear plate, where the speaker hole is formed, to the speaker assembly, wherein the speaker assembly may include a frame including at least one first opening formed on a first surface of surfaces of the speaker assembly, the first surface facing the audio duct, at least one second opening formed on a second surface of the surfaces, and a flow path connecting the at least one first opening and the at least one second opening, a sealing member disposed along a periphery of the frame and sealing the internal space, a diaphragm disposed within the frame and in contact with a portion of the sealing member, and at least one voice coil configured to provide vibration to the diaphragm.

A wearable device including a speaker frame having a vent hole may prevent, or reduce the possibility of, the vent hole from being blocked by a user's body, without including a separate vent hole on an outer surface of a housing, by balancing pressure of an internal space with external pressure through a speaker hole. Since the wearable device without a vent hole does not require a separate member for preventing damage to a waterproof membrane disposed in the vent hole during pneumatic test, a pneumatic test process can be shortened, and costs can be reduced.

The effects that can be obtained from the present disclosure are not limited to those described above, and any other effects not mentioned herein will be clearly understood from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
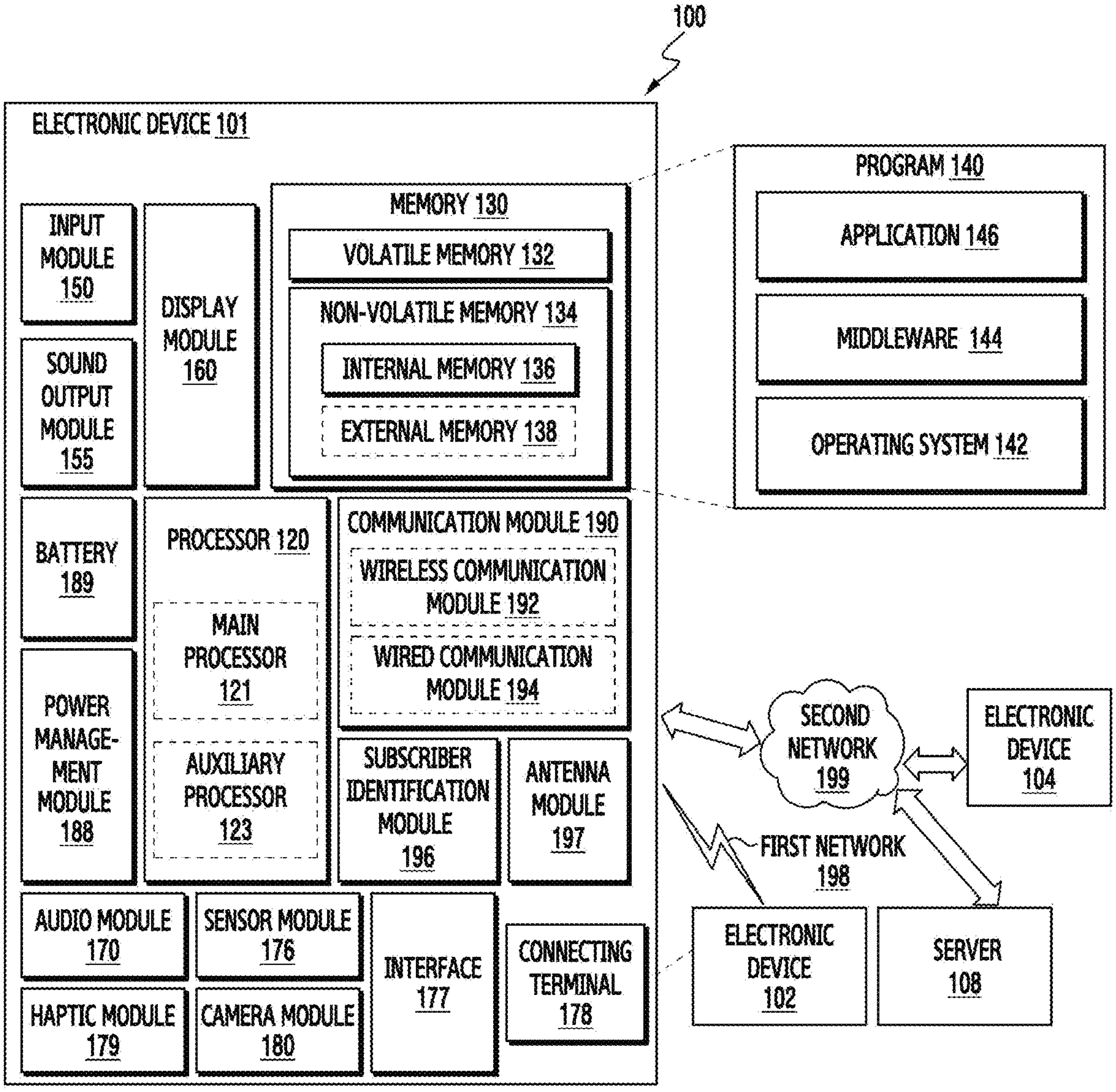
FIG. 1 is a block diagram of an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 according to various example embodiments of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
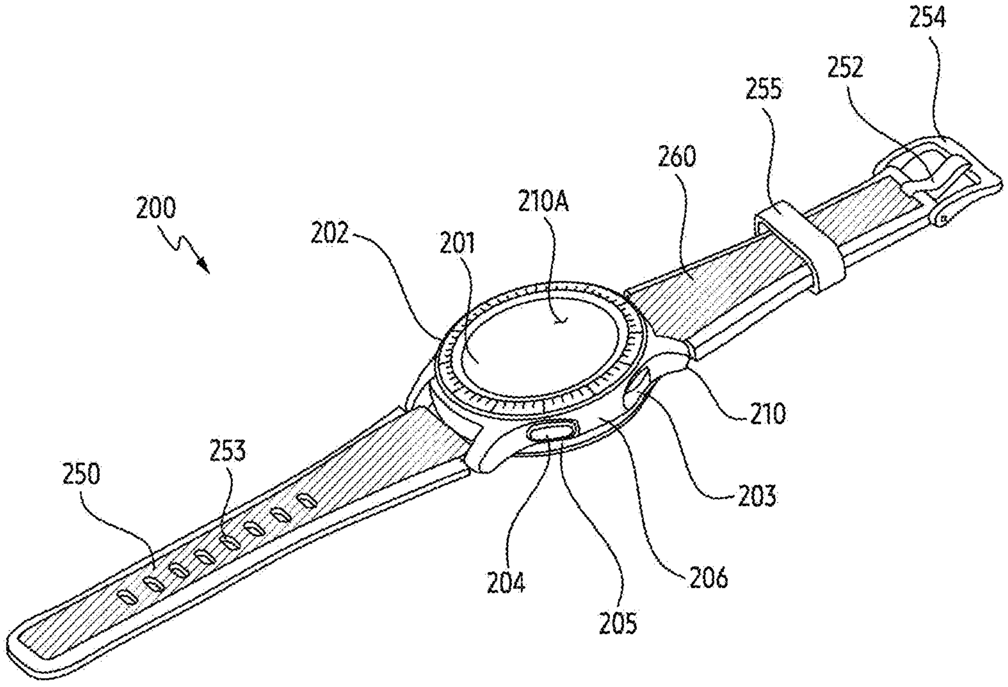
FIG. 2A is a front perspective view of an example electronic device according to various embodiments.
Figure 2B:
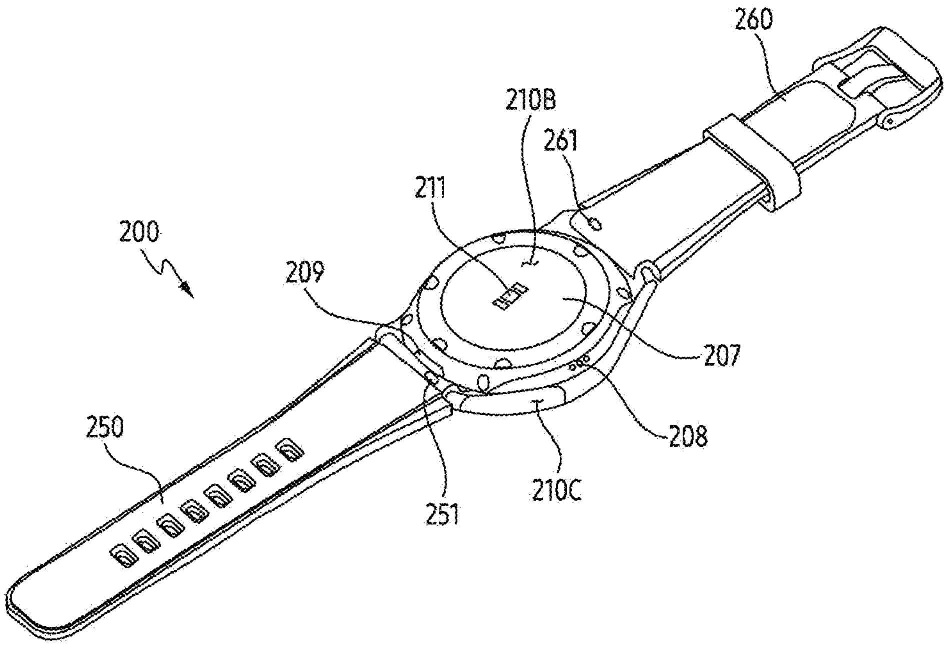
FIG. 2B is a rear perspective view of an example electronic device according to various embodiments.

FIGS. 2A and 2B are perspective views of an example electronic device according to various embodiments.

Referring to FIGS. 2A and 2B, an electronic device 200 (e.g., the electronic device 101 of FIG. 1) according to an embodiment may include a housing 210 including a first surface (or front surface) 210A, a second surface (or rear surface) 210B, and a side surface 210C surrounding the space between the first surface 210A and the second surface 210B. Binding members 250 and 260 are connected to at least a part of the housing 210 and configured to detachably attach the electronic device 200 to a part of the user's body (e.g., wrist, ankle, etc.). In an embodiment (not illustrated), the housing may also refer to a structure that forms at least a part of the first surface 210A, the second surface 210B, and the side surface 210C of FIGS. 2A and 2B. According to an embodiment, at least a part of the first surface 210A may be implemented by a substantially transparent front plate 201 (e.g., glass plate or polymer plate including various coating layers). The second surface 210B may be implemented by a substantially opaque rear plate 207. The rear plate 207 may be made of, for example, coated or colored glass, ceramic, polymer, metal (e.g., aluminum, stainless steel (STS), or magnesium), or a combination of at least two of the materials. The side surface 210C may be coupled to the front plate 201 and the rear plate 207 and may be implemented by a side bezel structure (or "side member") 206 including metal and/or polymer. In various embodiments, the rear plate 207 and the side bezel structure 206 may be integrated together and may include the same material (e.g., metal material such as aluminum). The binding members 250 and 260 may be made of various materials and may be made in various shapes. The binding members 250 and 260 may be made of, for example, woven fabric, leather, rubber, urethane, metal, ceramic, or a combination of at least two of the materials.

According to an embodiment, the electronic device 200 may include at least one of a display 220 (see FIG. 3), an audio module 205 and 208, a sensor module 211, a key input device 202, 203 and 204, and a connector hole 209. In various embodiments, the electronic device 200 may omit at least one of the components (e.g., the key input devices 202, 203 and 204, the connector hole 209, or the sensor module 211) or may further include other component(s).

The display 220 may be exposed, for example, through a substantial portion of the front plate 201. The shape of the display 220 may correspond to the shape of the front plate 201, such as circular (shown in FIG. 2), oval, or polygonal. The display 220 may be coupled to or adjacent to a touch sensing circuit, a pressure sensor capable of measuring the strength (pressure) of touches, and/or a fingerprint sensor.

The audio modules 205 and 208 may include a microphone hole 205 and a speaker hole 208. Corresponding to the microphone hole 205, a microphone for obtaining external sound may be disposed inside, and in various embodiments, a plurality of microphones may be disposed to detect the direction of the sound. The speaker hole 208 may be used with an external speaker and a receiver for phone calls. In various embodiments, the speaker hole 208 and the microphone hole 205 may be implemented as a single hole, or a speaker (e.g., piezo speaker) may be included without the speaker hole 208.

The sensor module 211 may generate electrical signal(s) or data value(s) corresponding to internal operating state(s) of the electronic device 200 or external environmental state(s). The sensor module 211 may include, for example, a biometric sensor module 211 (e.g., heart-rate monitor (HRM) sensor) disposed on the second surface 210B of the housing 210. The electronic device 200 may further include at least one sensor module not shown, such as a gesture sensor, a gyro sensor, a pressure sensor, a magnetic sensor, an acceleration sensor, a grip sensor, a color sensor, an infrared sensor, a biometric sensor, a humidity sensor, and/or an illumination sensor.

The key input devices 202, 203, and 204 may include a wheel key 202 disposed on the first surface 210A of the housing 210 and rotatable in at least one direction, and/or side key buttons 203 and 204 disposed on the side surface 210C of the housing 210. The wheel key may have a shape corresponding to the shape of the front plate 201. In an embodiment, the electronic device 200 may not include some or all of the above-described key input devices 202, 203, and 204, and the not included key input devices 202, 203, and 204 may be implemented in other forms such as, for example, soft keys on the display 220. The connector hole 209 may accommodate a connector (e.g., USB connector) for transmitting and receiving power and/or data to and from external electronic devices and may include another connector hole (not illustrated) capable of accommodating a connector for transmitting and receiving audio signals to and from an external electronic device. The electronic device 200 may further include, for example, a connector cover (not illustrated) that covers at least a part of the connector hole 209 and blocks the inflow of external foreign material into the connector hole.

The binding members 250 and 260 may be detachably attached to at least a part of the housing 210 using locking members 251, 261. The binding members 250 and 260 may include one or more of a fixing member 252, a fixing member fastening hole 253, a band guide member 254, and a band fixing ring 255.

The fixing member 252 may be configured to fix the housing 210 and the binding members 250 and 260 to a part of the user's body (e.g., wrist, ankle, etc.). The fixing member fastening hole 253 may correspond to the fixing member 252 to fix the housing 210 and the binding members 250 and 260 to the part of the user's body. The band guide member 254 may be configured to limit movement range of the fixing member 252 when the fixing member 252 is fastened to the fixing member fastening hole 253, so that the binding members 250 and 260 are attached to be in close contact with the part of the user's body. The band fixing ring 255 may limit the range of movement of the fixing members 250 and 260 when the fixing member 252 and the fixing member fastening hole 253 are fastened.

Figure 3:
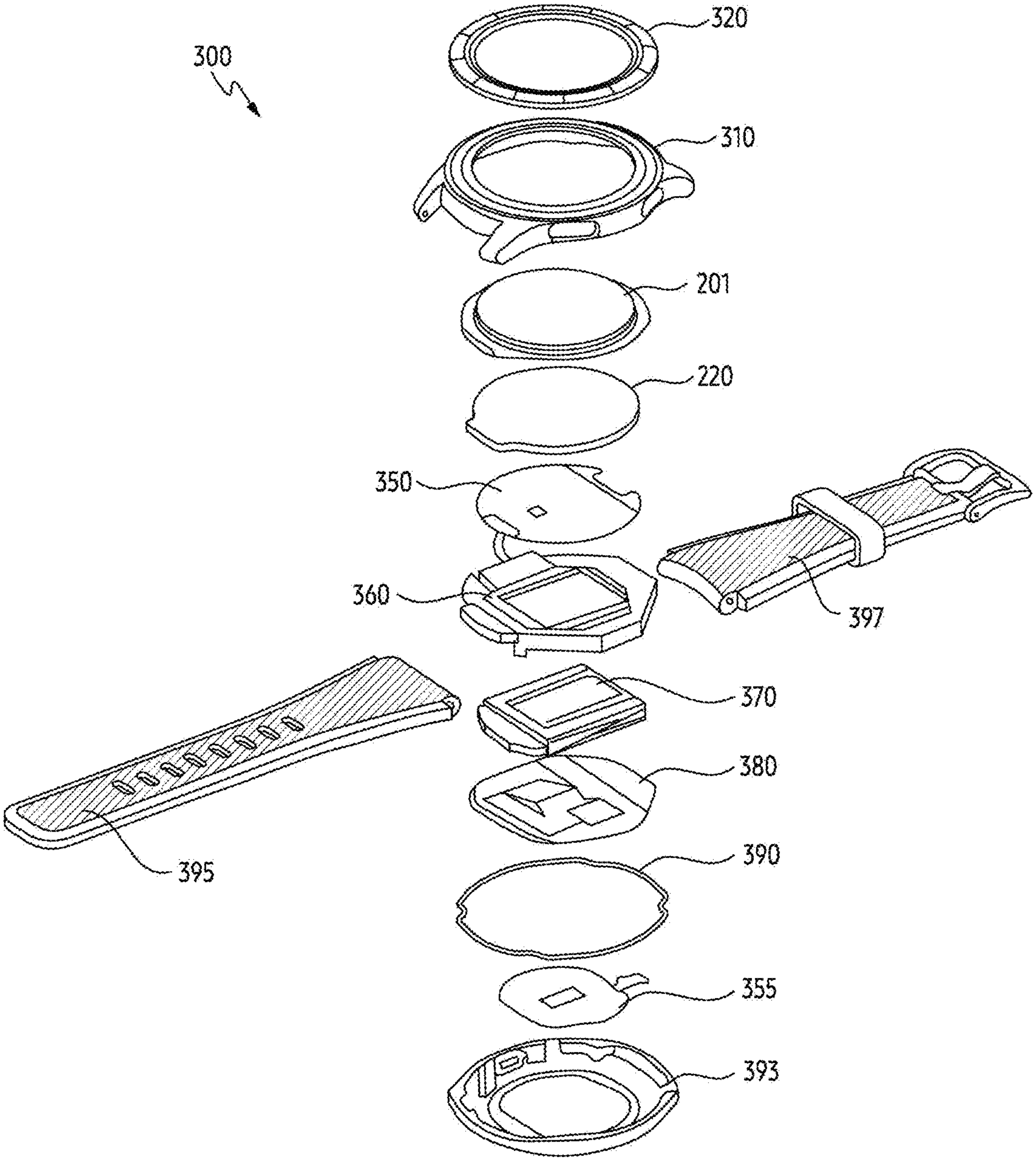
FIG. 3 is an exploded perspective view of an example electronic device according to various embodiments.

FIG. 3 is an exploded perspective view of an example electronic device according to various embodiments.

Referring to FIG. 3, an electronic device 300 (e.g., the electronic device 101 of FIG. 1, the electronic device 200 of FIG. 2A and/or FIG. 2B) may include a side bezel structure 310, a wheel key 320, a front plate 201, a display 220, a first antenna 350, a second antenna 355, a support member 360 (e.g., bracket), a battery 370, a printed circuit board 380, a sealing member 390, a rear plate 393, and binding members 395 and 397. At least one of the components of the electronic device 300 may be the same as or similar to at least one of the components of the electronic device 200 of FIGS. 2A, and/or 2B, and description thereof will not be repeated. The support member 360 may be disposed inside the electronic device 300 to be connected to the side bezel structure 310 or may be integral with the side bezel structure 310. The support member 360 may be made of, for example, metal material and/or non-metal (e.g., polymer) material. With respect to the support member 360, the display 220 may be coupled to one surface and the printed circuit board 380 may be coupled to the other surface. A processor, a memory, and/or an interface may be mounted on the printed circuit board 380. The processor may include, for example, one or more of a central processing unit, an application processor, a graphic processing unit (GPU), an application processor sensor processor, or a communication processor.

The memory may include, for example, a volatile memory or a nonvolatile memory. The interface may include, for example, a high-definition multimedia interface (HDMI), a universal serial bus (USB) interface, an SD card interface, and/or an audio interface. The interface may electrically or physically connect the electronic device 300 to an external electronic device, for example, and may include a USB connector, an SD card/MMC connector, or an audio connector.

The battery 370 is a device for supplying power to at least one component of the electronic device 300, and may include, for example, a non-rechargeable primary battery, a rechargeable secondary battery, or a fuel battery. At least a part of the battery 370 may be disposed on substantially the same plane as, for example, the printed circuit board 380. The battery 370 may be integrally disposed inside the electronic device 200 or may be disposed in the electronic device 200 to be user detachable.

The first antenna 350 may be disposed between the display 220 and the support member 360. The first antenna 350 may include, for example, a near field communication (NFC) antenna, a wireless charging antenna, and/or a magnetic secure transmission (MST) antenna. The first antenna 350 may, for example, perform short-range communication with an external device, wirelessly transmit and receive power required for charging, and transmit short-range communication signals such as ones containing payment data. In an embodiment, an antenna structure may be formed by at least a portion of the side bezel structure 310 and/or a part of the support member 360 or a combination thereof.

The second antenna 355 may be disposed between the printed circuit board 380 and the rear plate 393. The second antenna 355 may include, for example, a near field communication (NFC) antenna, a wireless charging antenna, and/or a magnetic secure transmission (MST) antenna. For example, the second antenna 355 may perform short-range communication with an external device, wirelessly transmit and receive power required for charging, and may transmit a short-range communication signal such as ones containing payment data. In an embodiment, an antenna structure may be formed by at least a portion of the side bezel structure 310 and/or a part of the rear plate 393 or a combination thereof.

The sealing member 390 may be positioned between the side bezel structure 310 and the rear plate 393. The sealing member 390 may be configured to block moisture and foreign material flowing into the space surrounded by the side bezel structure 310 and the rear plate 393 from the outside.

Figure 4:
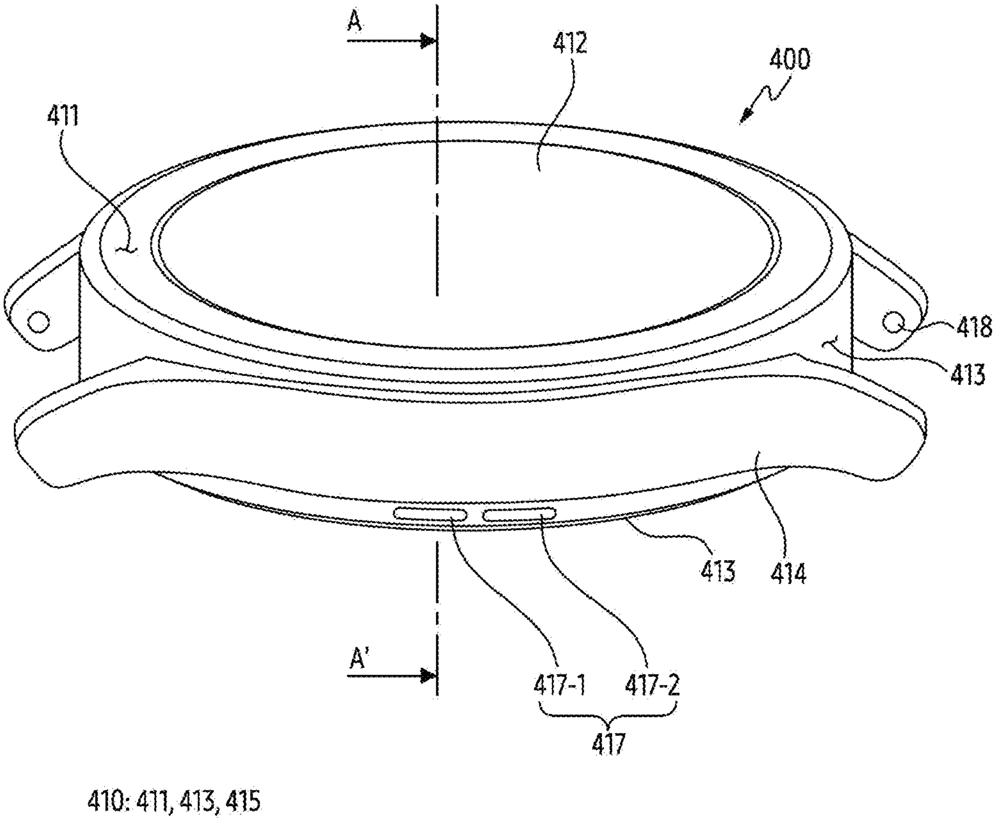
FIG. 4 is a perspective view of an example electronic device according to various embodiments.
Figure 5:
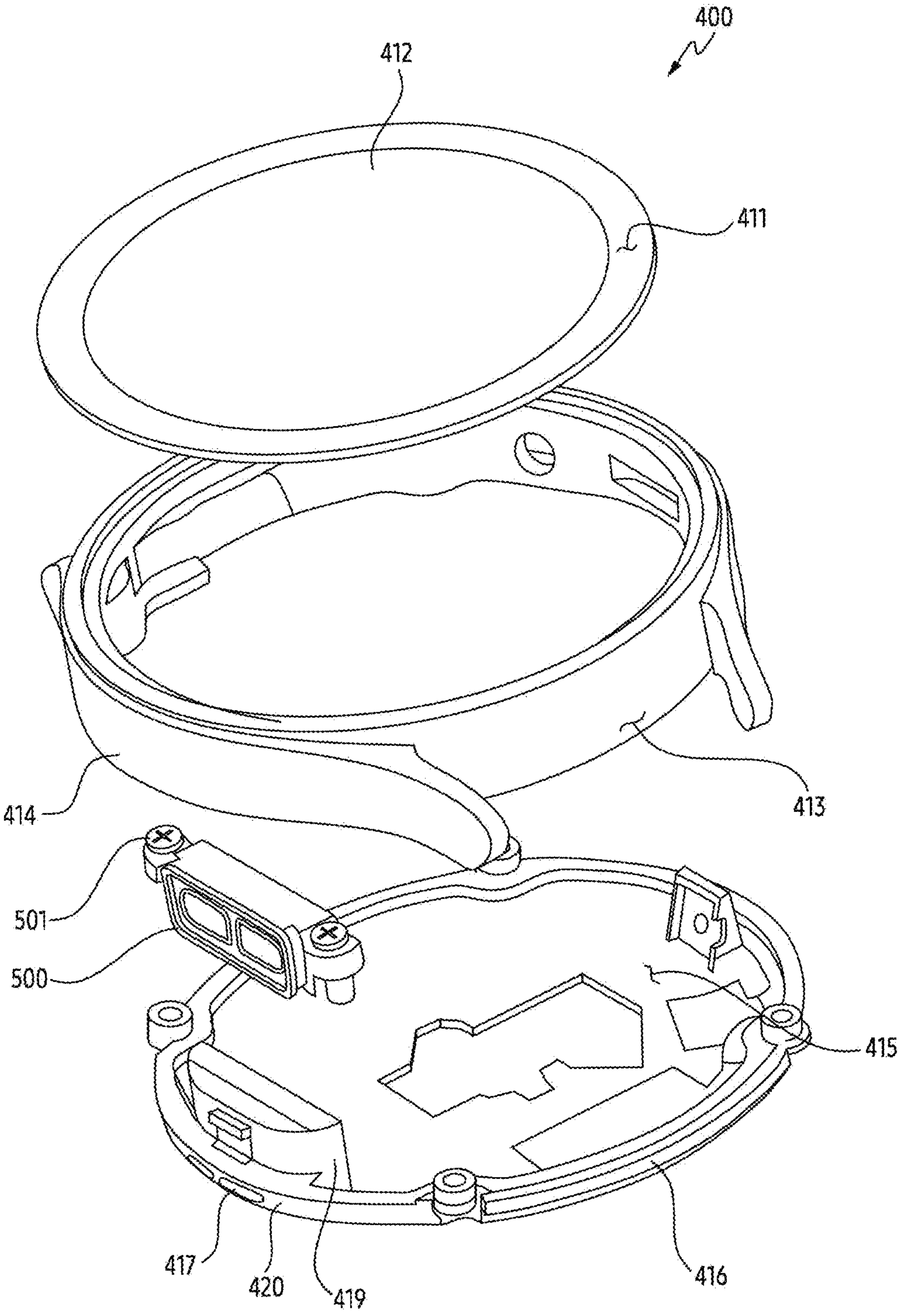
FIG. 5 is an exploded perspective view of an example electronic device according to various embodiments.

FIG. 4 is a perspective view of an example electronic device according to various embodiments. FIG. 5 is an exploded perspective view of an example electronic device according to various embodiments.

Referring to FIGS. 4 and 5, according to an embodiment, an electronic device 400 may include a housing 410 forming an exterior and a speaker assembly 500 outputting sound. According to an embodiment, the electronic device 400 may be referred to as a wearable device worn on a part of a user's body. According to an embodiment, the electronic device 400 may be implemented in a form of a watch capable of being worn on the user's wrist. For example, according to an embodiment, the electronic device 400 may be a smart watch capable of performing various functions. Hereinafter, the electronic device 400 according to an embodiment will be described based on a wearable device implemented in the form of a watch, but the electronic device 400 according to an embodiment is not limited thereto and may be variously implemented.

According to an embodiment, the housing 410 may include a front surface 411, a rear surface 415 facing the front surface 411, and a side surface 413 disposed along a periphery of the front surface 411 and the rear surface 415. The front surface 411, the rear surface 415, and the side surface 413 may form an internal space in which electronic components may be disposed.

According to an embodiment, a display 412 may be disposed on the front surface 411. The display 412 may display various screens. The display 412 may display an image indicating, for example, current time, video, text, and user-related information. The display 412 may display a graphic user interface (GUI) screen and an application execution screen. The display 412 may be implemented in the form of a touch screen display. The display 412 may include a touch panel for sensing a touch. The touch panel may be a capacitive touch sensor or may include a pressure sensitive touch sensor.

According to an embodiment, a rear plate 416 may be disposed on the rear surface 415. The rear plate 416 may face the display 412. The rear surface 415 may be formed by a substantially opaque rear plate 416. The rear plate 416 may include a partition wall 419 that divides an internal space so that electronic components may be disposed. For example, the rear plate 416 may include the partition wall 419 protruding from a surface facing the internal space toward the display 412. When the electronic device 400 is worn by the user, another surface of the rear plate 416 may contact a part of the user's body. For example, the rear plate 416 of the electronic device 400 in the form of a smart watch may contact the user's wrist.

According to an embodiment, a side bezel member 414 may be disposed on the side surface 413. The side bezel member 414 may surround at least a portion of the side surface 413. The side bezel member 414 may correspond to a shape of the side surface 413. When the side surface 413 has a ring shape, the side bezel member 414 may be curved with a curvature corresponding to a ring-shaped curvature of the side surface 413. The side bezel member 414 may be disposed between the display 412 and the rear plate 416. The side bezel member 414 may be formed integrally with the rear plate 416. The side bezel member 414 may be connected to a binding member (e.g., the binding members 250 and 260 of FIG. 2A). For example, the side bezel member 414 may include holes 418 into which a part of the binding member may be inserted. Since the holes 418 may be fastened to the binding member, the electronic device 400 may be connected to the binding member. As the binding member may be adjusted to a length corresponding to a part of the user's body, the rear plate 416 of the electronic device 400 may be in close contact with a part of the user's body.

According to an embodiment, the electronic device 400 may include a speaker hole 417 for transmitting sound emitted from a speaker assembly 500 to the outside of the electronic device 400. The speaker hole 417 may be formed in the housing 410. The speaker hole 417 may be formed on the rear plate 416 substantially forming the rear surface 415. The speaker hole 417 may penetrate from an outer surface of the rear plate 416 to an internal space. The rear plate 416 may have a circular plate shape having a certain thickness, and the speaker hole 417 may be formed in a portion forming the thickness. The rear plate 416 may include a protrusion 420 formed along a periphery of the rear plate 416 and having a coupling surface with the side surface 413. The protrusion 420 may form the same plane as the side surface 413 when coupled to the side bezel member 414. The speaker hole 417 may be formed on the protrusion 420. The speaker holes 417 may be plural. For example, the speaker hole 417 may include a first speaker hole 417 and a second speaker hole spaced apart from the first speaker hole.

According to an embodiment, the speaker hole 417 may function as a vent hole that induces a pressure balance between the internal space of the electronic device 400 and the outside. External air may flow to the internal space of the electronic device 400 through the speaker hole 417, and air in the internal space may flow to the outside of the electronic device 400 through the speaker hole 417. According to an embodiment, the electronic device 400 may use the speaker hole 417 as a vent hole, from a structure of the speaker hole 417 and the speaker assembly 500 of the internal space, without a separate vent hole.

According to an embodiment, the speaker assembly 500 may be disposed in the internal space. The speaker assembly 500 may be spaced apart from the speaker hole 417 to the internal space. The speaker assembly 500 may output audio by generating vibration according to a digital signal corresponding to audio information. The speaker assembly 500 may be adjacent to the speaker hole 417 in the internal space. For example, the speaker hole 417 may be formed at a periphery of the rear plate 416, the partition wall 419 may be formed spaced apart from the speaker hole 417 in the internal space, and the speaker assembly 500 may be fixed to the partition wall 419. The speaker assembly 500 may include a fastening member 501 (e.g., a fastener) capable of being fastened to the rear plate 416. For example, the speaker assembly 500 may include a fastening screw inserted into the rear plate 416, and, as the fastening screw is inserted into the rear plate 416, the speaker assembly 500 may be fastened to the partition wall 419. However, it is not limited thereto, and the speaker assembly 500 may be fixed to the rear plate 416 by various fastening methods such as screw coupling, hook coupling, or fitting coupling.

Figure 6:
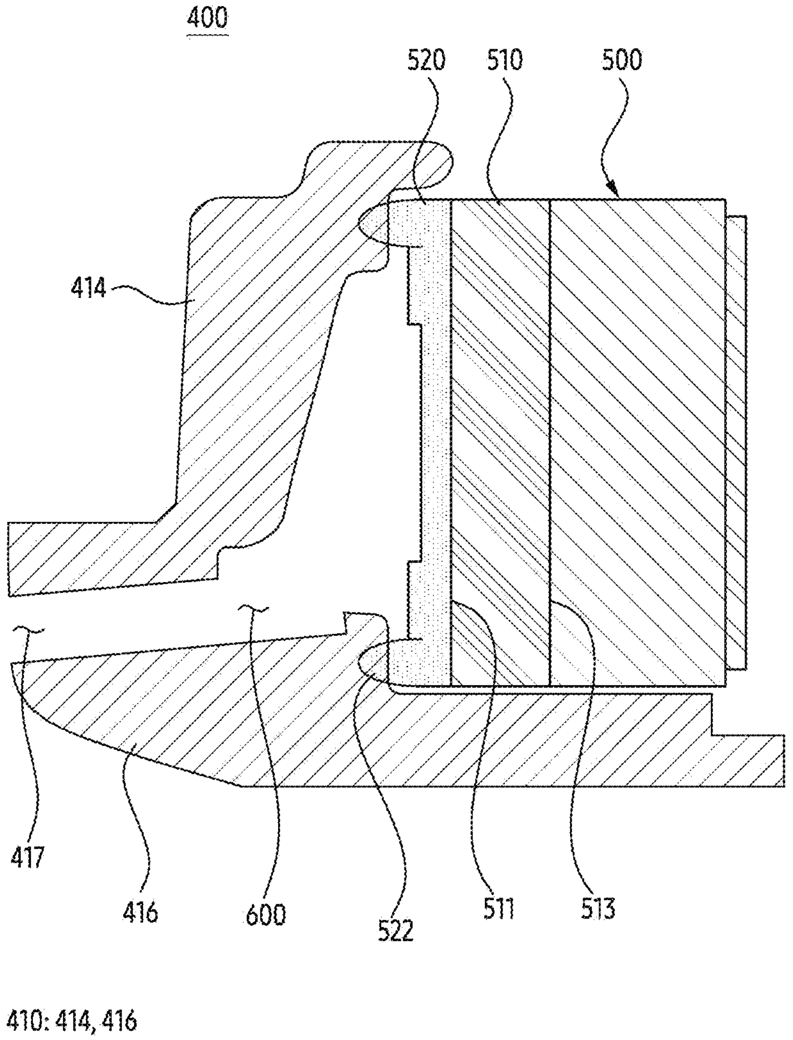
FIG. 6 is a section view of an example electronic device cut along line A-A' of FIG. 5, according to various embodiments.

FIG. 6 is a section view of an example electronic device cut along line A-A' of FIG. 4, according to various embodiments.

Referring to FIG. 6, according to an embodiment, an electronic device 400 may include an audio duct 600 that provides a transmission path for audio emitted from a speaker assembly 500. The audio duct 600 may connect the speaker assembly 500 and a speaker hole 417. Audio emitted from the speaker assembly 500 may be transmitted to the outside of the electronic device 400 through the audio duct 600. The audio duct 600 may be substantially formed by a housing 410 of the electronic device 400 and the speaker assembly 500. The audio duct 600 may extend from the speaker hole 417 formed in the housing 410 to the speaker assembly 500. Audio emitted from the speaker assembly 500 may be transmitted to the speaker hole 417 along the audio duct 600 and then transmitted to the outside of the electronic device 400. The transmission of audio may refer to, for example, transmission of vibration generated by the speaker assembly 500. The audio duct 600 may penetrate a partition wall (e.g., the partition wall 419 of FIG. 5) formed on a rear plate 416. A structure penetrating the partition wall 419 of the audio duct 600 may refer to, for example, a structure in which air flowing the audio duct 600 may be transmitted by passing through the partition wall 419. For example, when the speaker assembly 500 is disposed on a rear surface of the partition wall 419, audio emitted from the speaker assembly 500 may pass through the partition wall 419 and be transmitted to the audio duct 600, and then transmitted to the outside through the speaker hole 417.

According to an embodiment, the speaker assembly 500 may separate the audio duct 600 and an internal space by contacting the housing 410. A sealing member 520 of the speaker assembly 500 may separate the audio duct 600 and the internal space by sealing the audio duct 600 and the internal space. The separation of the audio duct 600 and the internal space may refer to, for example, the speaker assembly 500 being disposed between the audio duct 600 and the internal space, and the audio duct 600 and the internal space are spatially isolated by the sealing member 520 of the speaker assembly 500. Since the audio duct 600 and the internal space are separated by the sealing member 520, external air flowing from the speaker hole 417 may not flow into the internal space but may remain in the audio duct 600. For example, the sealing member 520 may be spaced apart from the speaker hole 417 to form the audio duct 600. A portion of an area 522 formed on a surface of the sealing member 520 facing the audio duct 600 may be in contact with the rear plate 416 and a side bezel member 414.

According to an embodiment, the speaker assembly 500 may include a sealing member 520 including an area 522 contacting the inner surface of the housing 410. A frame 510 may include a first surface 511 and a second surface 513 different from the first surface 511. The area 522 may cover the first surface 511 by coupling at least a part of the first surface 511 facing the audio duct 600 of the frame 510. For example, the area 522 may seal the internal space from the audio duct 600 by extending from the first surface 511 of the frame 510 to the rear plate 416 and/or the side bezel member 414. The area 522 may spatially separate the audio duct 600 from the internal space.

According to an embodiment, the sealing member 520 may be adhered to the first surface 511 by an adhesive. Air flowing into the audio duct 600 through the speaker hole 417 may be blocked from flowing into the internal space by the sealing member 520. The sealing member 520 may prevent external fluid introduced through the audio duct from flowing into the internal space. The sealing member 520 may be made of a rubber material for isolating the internal space and the audio duct for waterproofing. A part of area 522 may be connected to the housing 410 by protruding toward the audio duct 600. For example, the part of the area 522 may be connected to the side bezel member 414, and another part of the area 522 may be connected to the rear plate 416.

Figure 7:
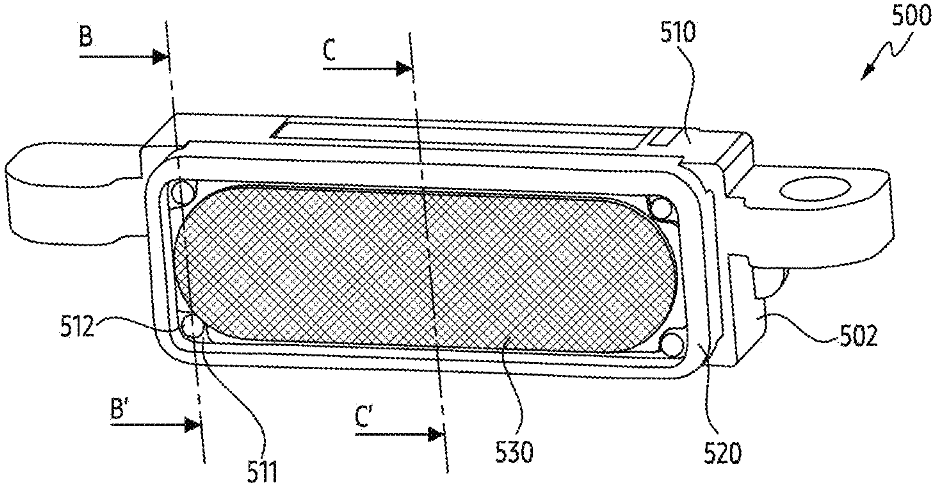
FIG. 7 is a perspective view of an example speaker assembly of an example electronic device according to various embodiments.

FIG. 7 is a perspective view of an example speaker assembly of an example electronic device according to various embodiments.

Referring to FIG. 7, according to an embodiment, a speaker assembly 500 may include a frame 510 and a sealing member 520. The frame 510 may be connected to a mechanism 502 fastened to a housing 410. The mechanism 502 may support the frame 510 and the sealing member 520 by being fastened to the housing 410. The speaker assembly 500 may include the mechanism 502 supporting the frame 510, and the mechanism 502 may be fixed to an internal space.

According to an embodiment, a speaker grill 530 may be disposed on a surface of the frame 510. The speaker grill 530 may cover a surface of the frame 510. The speaker grill 530 may include a plurality of through holes formed at certain intervals so that audio emitted from the speaker assembly 500 may be smoothly transmitted. For example, the speaker grill 530 may be an emitting hole mesh grill 530. The speaker grill 530 may prevent inflow of foreign substances into the speaker assembly 500, form a path for outputting audio, and form an exterior design of the speaker assembly 500.

According to an embodiment, the frame 510 may form an exterior of the speaker assembly 500. The frame 510 may include at least one first opening 512 formed on a first surface 511 facing the speaker grill 530 of the frame 510. At least one first opening 512 may be spatially connected to the audio duct 600. For example, air flowing the audio duct 600 may be introduced into the at least one first opening 512.

According to an embodiment, the sealing member 520 may separate the audio duct 600 from the internal space by the speaker assembly 500, by sealing the first surface 511 of the speaker assembly 500. The sealing member 520 may be disposed along a periphery of the frame 510. According to an embodiment, a part of the sealing member 520 may be inserted into the frame 510. According to an embodiment, the frame 510 may be sealed by the sealing member 520, by accommodating a part of the sealing member 520. The sealing member 520 may include a flexible material to seal the first surface 511 of the frame 510. For example, the sealing member 520 may include rubber, fiber material, silicone, and synthetic resin material. The sealing member 520 may cover the entire first surface 511 facing the speaker grill 530 of the frame 510. The speaker assembly 500 may separate the audio duct 600 from the internal space by the sealing member 520.

According to an embodiment, at least one first opening 512 may be formed on the first surface 511. For example, at least one first opening 512 may be adjacent to a corner of the first surface 511 of the frame 510. For example, a shape of the first surface 511 of the frame 510 may be rectangular, and at least one first opening 512 may be spaced apart from four corners of the first surface 511 toward a center of the frame 510. As at least one the first openings 512 is connected to the audio duct 600, air flowing the audio duct 600 may be introduced. For example, air introduced through the speaker hole 417 may be introduced into at least one first opening 512.

Figure 8A:
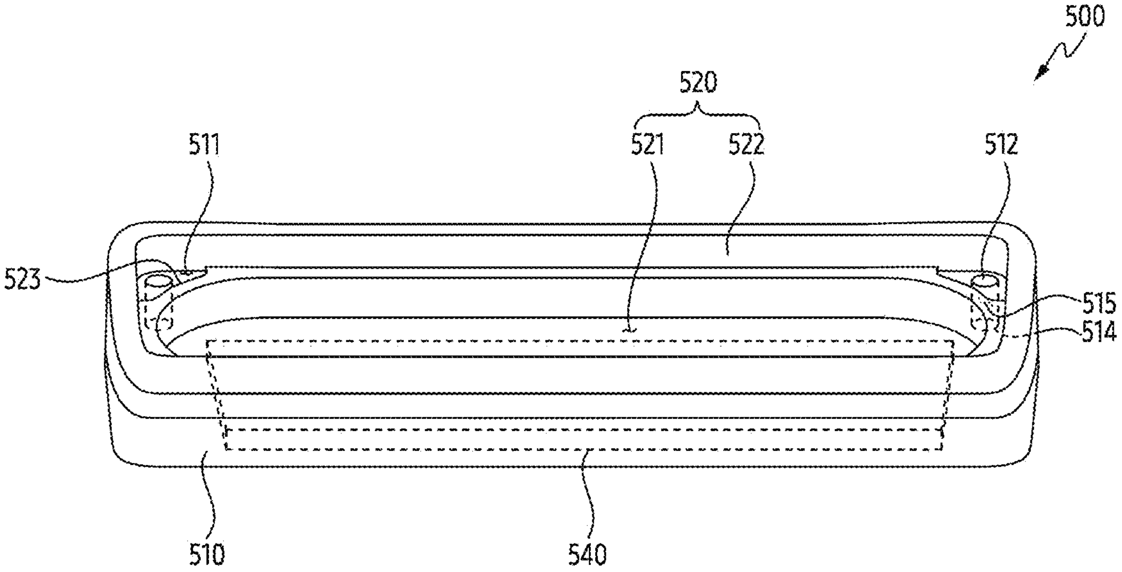
FIG. 8A is a perspective view of a frame and a sealing member of an example speaker assembly of an example electronic device according to various embodiments.
Figure 8B:
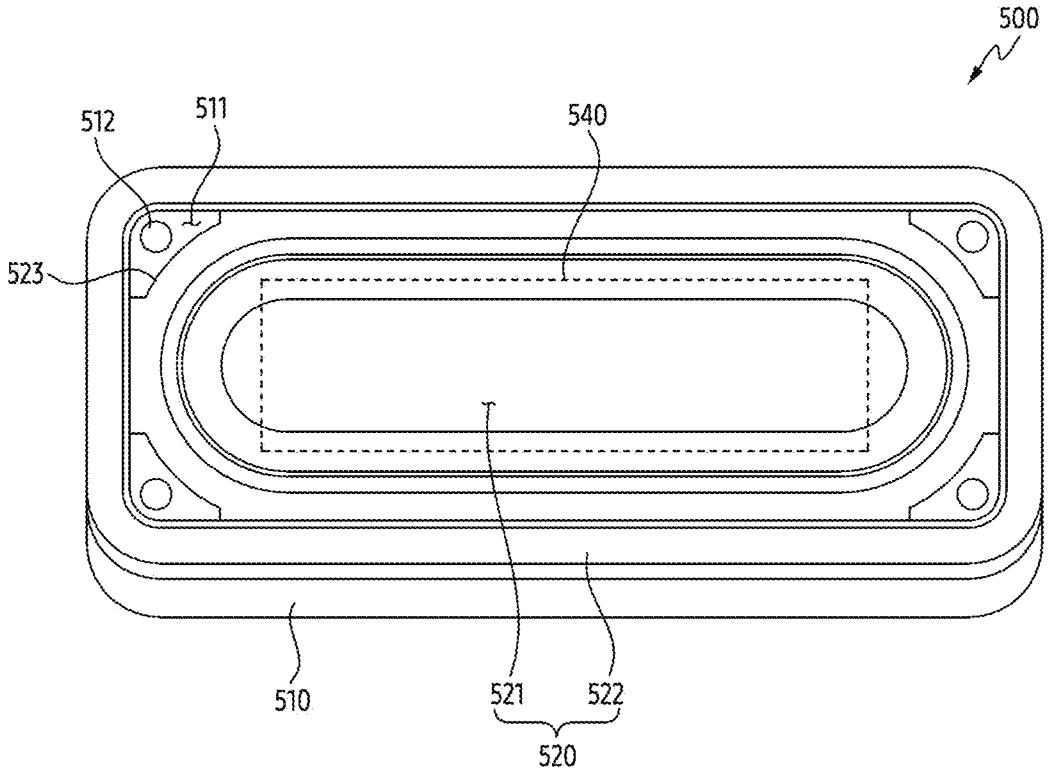
FIG. 8B is a plan view of a frame and a sealing member of an example speaker assembly of an example electronic device according to various embodiments.
Figure 8C:
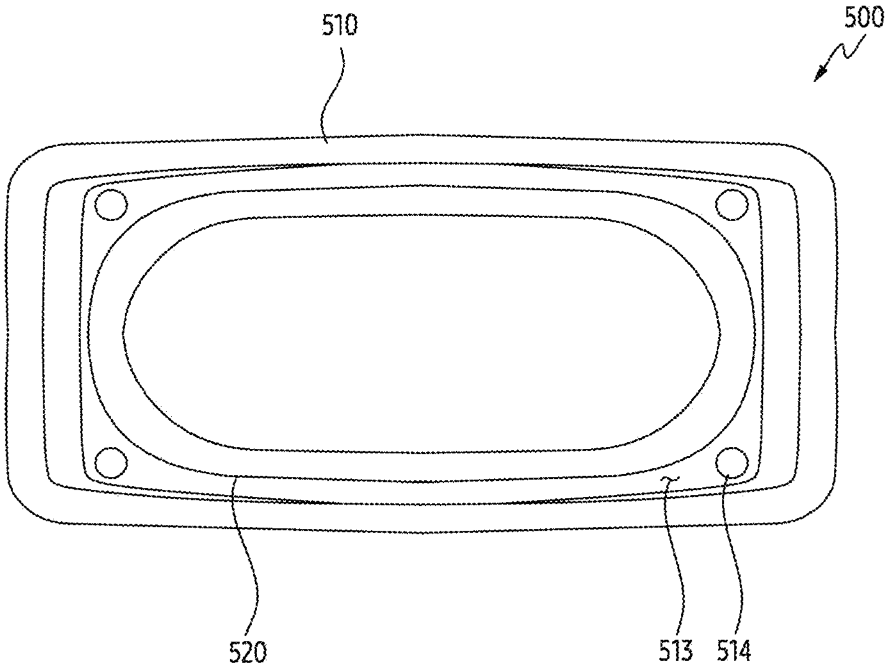
FIG. 8C is a bottom view of a frame and a sealing member of an example speaker assembly of an example electronic device according to various embodiments.

FIG. 8A is a perspective view of a frame and a sealing member of an example speaker assembly of an example electronic device according to various embodiments. FIG. 8B is a plan view of a frame and a sealing member of an example speaker assembly of an example electronic device according to various embodiments. FIG. 8C is a bottom view of a frame and a sealing member of an example speaker assembly of an example electronic device according to various embodiments. FIGS. 8A, 8B, and 8C illustrate a state in which a speaker grill 530 is omitted from the speaker assembly 500 shown in FIG. 7.

Referring to FIG. 8A, according to an embodiment, a speaker assembly 500 may include a diaphragm 540 disposed in a frame 510 and in contact with a part of a surface facing an internal space of a sealing member 520. The diaphragm 540 may generate audio by vibrating. The diaphragm 540 may include, for example, a polyetherimide (PEI) film, a poly ethylene naphthalate (PEN) film, a polyphenylene sulfide (PPS) film, a polyetheretherketone (PEEK) film, or a paper (congee)-based material.

According to an embodiment, the sealing member 520 may include a first area 521 disposed on the diaphragm 540 and a second area 522 distinct from the first area 521. The first area 521 may refer to, for example, an area of the sealing member 520 in contact with the diaphragm 540, and the second area 522 may refer to, for example, a remaining area of the sealing member 520 except for the first area 521. The first area 521 may vibrate based on vibration of the diaphragm 540. As the diaphragm 540 vibrates, the first area 521 may also vibrate. At least a portion of the second area 522 may protrude from the first surface 511 of the frame 510 toward an audio duct (e.g., the audio duct 600 of FIG. 6). The second area 522 may be in contact with an inner surface of a housing (e.g., the housing 410 of FIG. 6).

Referring to FIG. 8B, according to an embodiment, the second area 522 may be disposed along a periphery of the frame 510. For example, a shape of the first surface 511 of the frame 510 may be a rectangle, and the second area 522 may be disposed along four corners of the first surface 511. The diaphragm 540 may be in contact with a surface of the first area 521 facing the internal space. Since the second area 522 may protrude toward an audio duct (e.g., the audio duct 600 of FIG. 6), the first area 521 may be disposed closer to the first surface 511 than the second area 522. The first area 521 and the second area 522 may be integrally formed. According to an embodiment, the sealing member 520 may be formed to expose at least one first opening 512 toward the audio duct. For example, the second area 522 may include a third opening 523 larger than at least one first opening 512 in an area corresponding to the at least one first opening 512. The third opening 523 may surround the first opening 512. At least one first opening 512 may be formed between a periphery of the frame 510 and an area corresponding to the diaphragm 540 in the first surface 511, and the third opening 523 may be formed in an area of the frame 510 corresponding to the at least one first opening 512.

Referring to FIG. 8C, the frame 510 may include at least one second opening 514 formed on the second surface 513. At least one second opening 514 may be connected to at least one first opening 512. At least one second opening 514 may be connected to an internal space. Referring to FIG. 8A, the frame 510 may include a flow path 515 connecting at least one first opening 512 and at least one second opening 514. At least one first opening 512 may refer to, for example, an opening of an end of the flow path 515, and at least one second opening 514 may refer to, for example, an opening of another end of the flow path 515. The flow path 515 may allow air flow between a space where the first surface 511 faces and a space where the second surface 513 faces, by connecting the first opening 512 and the second opening 514. The flow path 515 may connect the audio duct 600 and the internal space, and air may flow between the audio duct 600 and the internal space.

At least one first opening 512 and at least one second opening 514 may face each other. At least one first opening 512 may be formed at a corner of the first surface 511, and at least one second opening 514 may be formed at a corner of the second surface 513. At least one first opening 512 and at least one second opening 514 may be disposed between a periphery of the frame 510 and an area corresponding to the diaphragm 540.

In an embodiment, an audio duct (e.g., the audio duct 600 of FIG. 6) may be located in a space where the first surface 511 faces, and an internal space may be located in a space where the second surface 513 faces. The audio duct 600 and the internal space may be spatially separated by the frame 510 and the sealing member 520. The audio duct 600 and the internal space are spatially separated from each other, but may be connected to allow air to pass through the flow path 515. Air may flow between the audio duct 600 and the internal space, through at least one first opening 512 formed on the first surface 511 of the frame 510 and at least one second opening 514 and the flow path 515 formed on the second surface 513 of the frame 510. For example, air introduced into the electronic device 400 through the speaker hole 417 may be introduced into at least one first opening 512 by passing the audio duct 600. The air introduced into the at least one first opening 512 may flow through the flow path 515 to the at least one second opening 514 and flow into the internal space. For example, air in the internal space may flow into the at least one second opening 514, pass through the flow path 515, flow through the at least one first opening 512 to the audio duct 600, and flow from the audio duct 600 to the outside of the electronic device 400 through the speaker hole 417.

According to an embodiment, the electronic device 400 may balance pressure of the internal space with external pressure, through at least one first opening 512 formed on the first surface 511 of the frame 510, at least one second opening 514 formed on the second surface 513 of the frame 510, and the flow path 515 connecting the first opening 512 and the second opening 514. The external pressure may refer to, for example, a pressure applied to the electronic device 400 in an external environment of the electronic device 400. When the pressure of the internal space of the electronic device 400 and the external pressure are different, mechanical damage to the electronic device 400 may occur, and failure may occur when electronic components are operated. According to an embodiment, the electronic device 400 may balance the pressure of the internal space with the pressure of the external space by including a structure in which the speaker hole 417 may function as a vent hole without including a separate vent hole on the exterior of the housing 410.

According to an embodiment, in the electronic device 400, when the external pressure is higher than the internal space pressure, external air may flow into the internal space by passing through the speaker hole 417, the audio duct 600, the first opening 512, the flow path 515, and the second opening 514, and the pressure of the internal space may increase due to the inflow of air. According to an embodiment, in the electronic device 400, when the internal space pressure is higher than the external pressure, air in the internal space may flow to the outside of the electronic device 400 by passing through the second opening 514, the flow path 515, the first opening 512, the audio duct 600, and the speaker hole 417. For example, when a user wearing the electronic device 400 moves to a place with a high altitude, a difference between the internal space pressure and the external pressure may occur due to a decrease in atmospheric pressure. According to an embodiment, the electronic device 400 may balance the internal space pressure and the external pressure by allowing air of the internal space to flow to the outside through the speaker hole 417.

Figure 9:
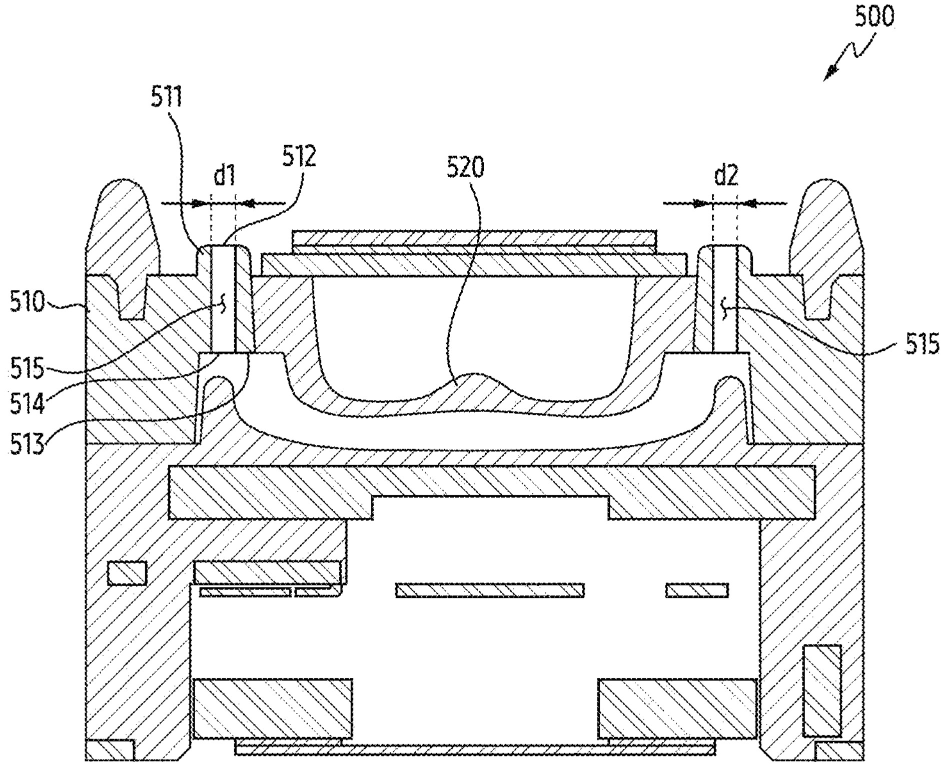
FIG. 9 is a section view of an example electronic device cut along line B-B' of FIG. 7, according to various embodiments.

FIG. 9 is a section view of an example electronic device cut along line B-B' of FIG. 7, according to various embodiments.

Referring to FIG. 9, according to an embodiment, a first surface 511 of a speaker assembly 500 may be covered by a sealing member 520. The sealing member 520 may separate an audio duct 600 and an inside of a frame 510. At least one first opening 512 and at least one second opening 514 may face each other. For example, at least one first opening 512 may be formed at a corner of the first surface 511, and at least one second opening 514 may be connected to at least one first opening 512 through a flow path 515 extending linearly from the at least one first opening 512.

According to an embodiment, the at least one first opening 512, the at least one second opening 514, and the flow path 515 may be formed in plural. For example, shapes of the first and second surfaces 511 and 513 of the frame 510 may be rectangular, and four openings 512, flow paths 515, and second openings 514 adjacent to each of the four corners may be formed. A plurality of flow paths 515 may have different cross-sectional areas. Among the plurality of flow paths 515, a diameter d1 of any one flow path 515 and a diameter d2 of another flow path 515 may be different from each other. The plurality of flow paths 515 may have different gas resistance characteristics by having different cross-sectional areas. For example, air flow through a flow path 515 with a large diameter may be smoother than air flow through a flow path 515 with a small diameter. According to an embodiment, the electronic device 400 may differently configure cross-sectional areas of the plurality of flow paths 515, according to an arrangement structure of electronic components arranged in the internal space. For example, a cross-sectional area of a flow path 515 facing an electronic component, which is sensitive to contact with air, may be smaller than cross-sectional areas of other flow paths 515.

According to an embodiment, the inside of the frame 510 may be connected to the internal space. That the inside of the frame 510 is connected to the internal space may refer to, for example, air flow between the inside of the frame 510 and the internal space being allowed. For example, air introduced into the frame 510 through at least one first opening 512, flow path 515, and at least one second opening 514 may flow into the internal space. Air in the internal space may flow through at least one second opening 514, flow path 515, and at least one first opening 512 to the audio duct 600.

According to an embodiment, since the speaker assembly 500 allows air flow while spatially separating the audio duct 600 from the internal space, a balance between the internal space and the external pressure may be adjusted. For example, in case that liquid (e.g., moisture) flows into the electronic device 400 through the speaker hole 417, when the introduced liquid flows into the internal space through the audio duct 600, it may cause damage to electronic components located in the internal space. The speaker assembly 500 may prevent liquid introduced into the electronic device 400 from flowing into the internal space, by spatially separating the audio duct 600 and the internal space.

According to an embodiment, the speaker assembly 500 may balance the internal space pressure and the external pressure by allowing air flow between the internal space and the audio duct 600. At least one first opening 512, flow path 515, and at least one second opening 514 formed in the frame 510 may provide a path through which air flows between the internal space and the audio duct 600. According to an embodiment, the speaker assembly 500 may provide a path through which air may flow between the internal space and the audio duct 600, according to a difference between the internal space pressure and the external pressure. Since the audio duct 600 is connected to the speaker hole 417, it may be possible to flow between external air and air in the internal space through the speaker hole 417. According to an embodiment, the speaker hole 417 is a path for transmitting audio emitted from the speaker assembly 500 disposed in the internal space to the user, and may also be an air flow path for balancing the internal space pressure and the external pressure.

A general electronic device may include a vent hole connected to the outside and the inside of the electronic device, in order to balance the internal space pressure and the external pressure. In the case of a wearable device, since it is worn on a part of the user's body, a part of the wearable device and a part of the user's body may contact each other. When the wearable device is worn on the user's body, a part or all of the vent hole may be covered by the part of the user's body, so that air flow may not be smooth. For example, in a case of a smart watch worn on the user's wrist, a vent hole may be formed on a rear plate. When the smart watch is worn by the user, the vent hole may be blocked by the user's wrist, and extent of the vent hole may be narrowed by the user's wrist, so that air flow may not be smooth. When air flow is not smooth, a difference between the internal space pressure and the external pressure of the electronic device occurs, thereby causing damage to the electronic device.

According to an embodiment, the electronic device 400 may prevent, or reduce the possibility of, a vent hole from being blocked by a user's body. In an embodiment, since the speaker hole 417 may perform a function of the vent hole, a possibility that the speaker hole 417 capable of performing the function of the vent hole may be blocked by a part of the user's body may be reduced. For example, according to an embodiment, when the electronic device 400 is implemented in a form of a watch, since the speaker hole 417 may be formed toward a side of the electronic device 400, the speaker hole 417 may not contact the user's body. According to an embodiment, the electronic device 400 may balance the internal space pressure and the external pressure through the speaker hole 417 formed toward the side, even when worn on the user's wrist.

Figure 10:
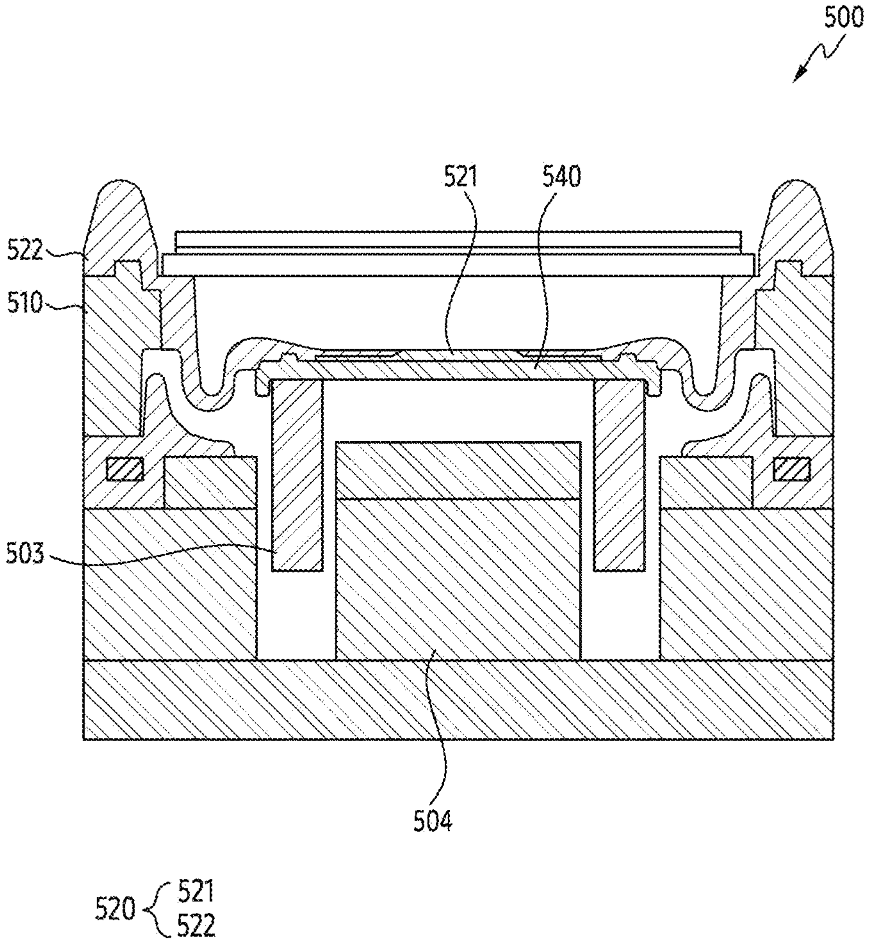
FIG. 10 is a section view of an example electronic device cut along line C-C' of FIG. 7, according to various embodiments.

FIG. 10 is a section view of an example electronic device cut along line C-C' of FIG. 7, according to various embodiments.

Referring to FIG. 10, according to an embodiment, a speaker assembly 500 may include at least one voice coil 503 that provides vibration to a diaphragm 540 and a permanent magnet 504 capable of forming a magnetic field. The at least one voice coil 503 may be positioned between the permanent magnet 504. According to an embodiment, the speaker assembly 500 may output audio by generating vibration of the diaphragm 540 when a current having audio information flows through the voice coil 503. When a current having audio information flows through the voice coil 503, the permanent magnet 504 may form a magnetic field, and the voice coil 503 may also form a magnetic field. The voice coil 503 may move by action of a magnetic field from the permanent magnet 504 and a magnetic field from the voice coil 503 attracting or repulsing each other. As the diaphragm 540 vibrates in response to the movement of the voice coil 503, audio may be outputted.

Figure 11:
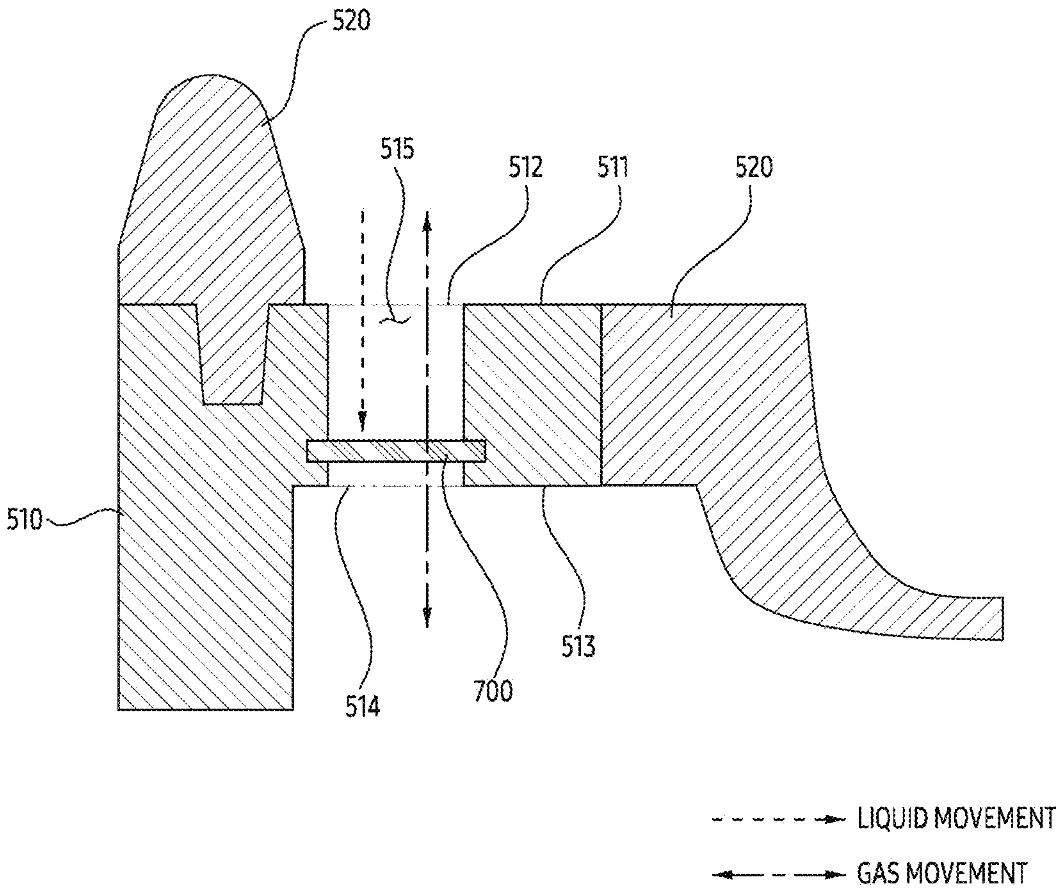
FIG. 11 illustrates an example in which a waterproof membrane is disposed in a flow path of an example electronic device, according to various embodiments.

FIG. 11 illustrates an example in which a waterproof membrane is disposed in a flow path of an example electronic device, according to various embodiments.

Referring to FIG. 11, according to an embodiment, an electronic device 400 may include a waterproof membrane 700 disposed in a flow path 515. According to an embodiment, the waterproof membrane 700 may be disposed in the flow path 515 to prevent liquid transferred through an audio duct 600 from the outside of a housing 410 from flowing into an internal space. The waterproof membrane 700 may be made of a material capable of blocking transmission of liquid. For example, the waterproof membrane 700 may be a sheet applied with an acryl resin-based material or an epoxy-based material. As another example, it may be a sheet on which an acryl rubber-based, urethane rubber-based, or chloroprene rubber-based coating film is formed. For still another example, the waterproof membrane 700 may be a polyisobutyl rubber-based sheet, a butyl rubber-based sheet, a vinyl chloride-based sheet, and a polyethylene-based sheet.

According to an embodiment, the waterproof membrane 700 may block passage of liquid such as water and allow passage of a gas such as air. The waterproof membrane 700 may prevent or reduce damage to electronic components disposed in the internal space by preventing or reducing inflow of liquid such as water into the internal space, and balance pressure of the internal space and the external pressure by allowing air flow.

The waterproof membrane 700 may be disposed in at least one first opening 512 and/or at least one second opening 514. The waterproof membrane 700 may be included in the flow path 515 by being manufactured in the frame 510 by insert injection when manufacturing the frame 510, and may be attached to at least one first opening 512 and/or at least one second opening 514 of the frame 510 in which manufacturing is completed. Even when the flow path 515 is connected to the internal space, inflow of liquid into the internal space may be blocked or reduced by the waterproof membrane 700.

Figure 12:
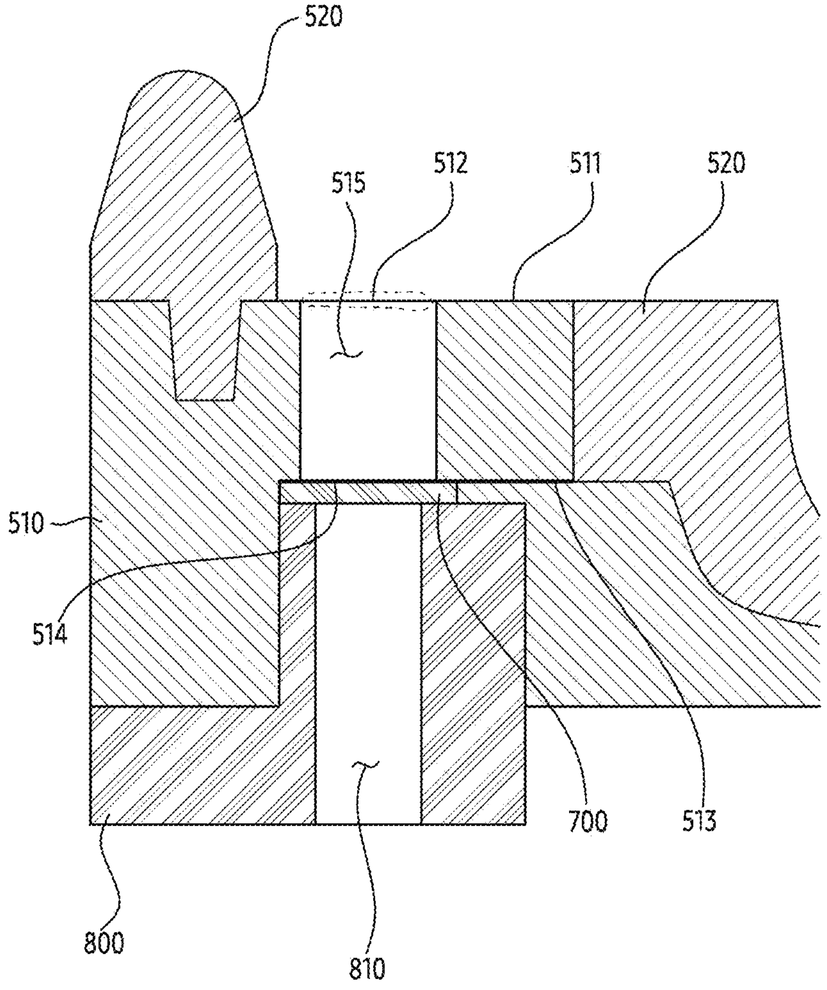
FIG. 12 illustrates an example in which a supporting portion is disposed in an example frame of an example electronic device according to various embodiments.

FIG. 12 illustrates an example in which a supporting portion is disposed in an example frame of an example electronic device according to various embodiments.

Referring to FIG. 12, according to an embodiment, an electronic device 400 may include a supporting portion 800 and a waterproof membrane 700 disposed between the supporting portion 800 and a frame 510. The waterproof membrane 700 may be adjacent to at least one second opening 514. The supporting portion 800 may include a through hole 810 connecting a flow path 515 and an internal space. A surface of the through hole 810 may face the flow path 515, and another surface facing the surface may face the internal space. Through the through hole 810 connected to the flow path 515, air may flow between the internal space and the audio duct 600. For example, air introduced from the audio duct 600 to the flow path 515 may flow into the internal space by passing through the through hole 810. For another example, air in the internal space may flow into the through hole 810, and then flow to the audio duct 600 by passing through the flow path 515.

The waterproof membrane 700 may be supported by the supporting portion 800, by being disposed between the supporting portion 800 and the frame 510. The supporting portion 800 may support the waterproof membrane 700 so that the waterproof membrane 700 is positioned in a correct position. The supporting portion 800 may be in contact with the second surface 513. According to an embodiment, the frame 510 may not require adding a separate process, to dispose the waterproof membrane 700 in the flow path 515, and may not require connecting the waterproofing membrane 700 in the at least one first opening 512 and/or the at least one second opening 514. Since the waterproof membrane 700 is supported through the supporting portion 800, the inflow of liquid into the internal space may be prevented or reduced.

Figure 13:
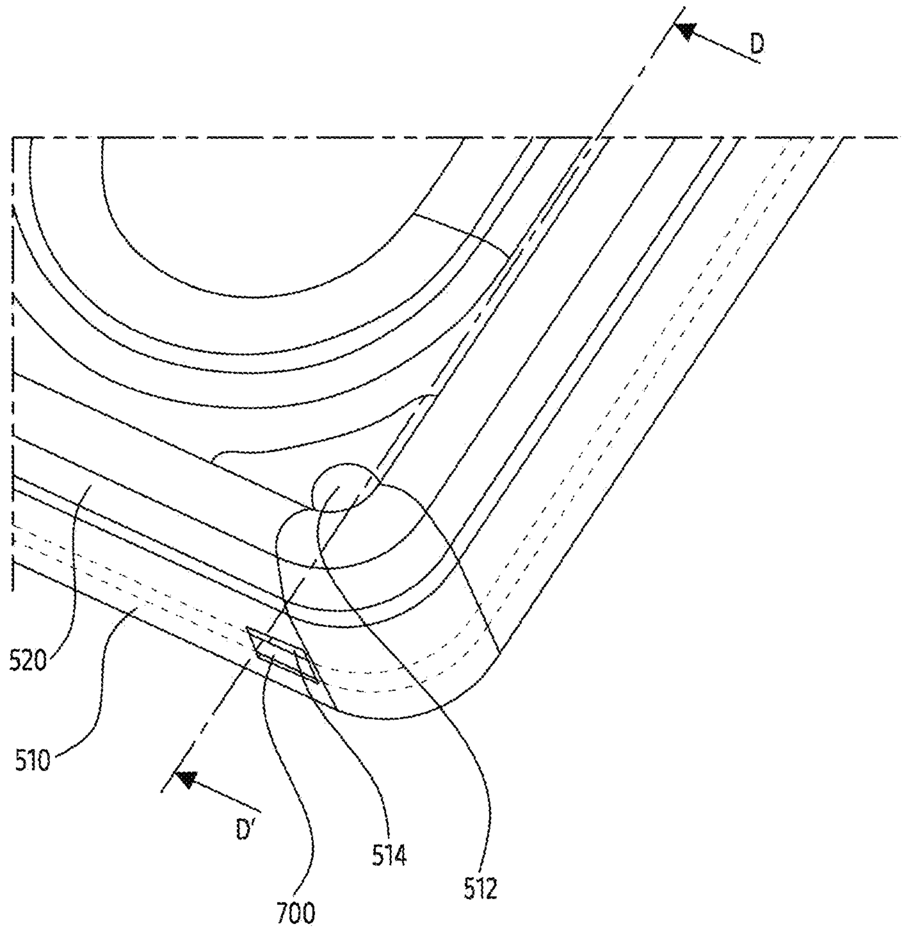
FIG. 13 illustrates a portion of a perspective view of an example electronic device according to various embodiments.
Figure 14:
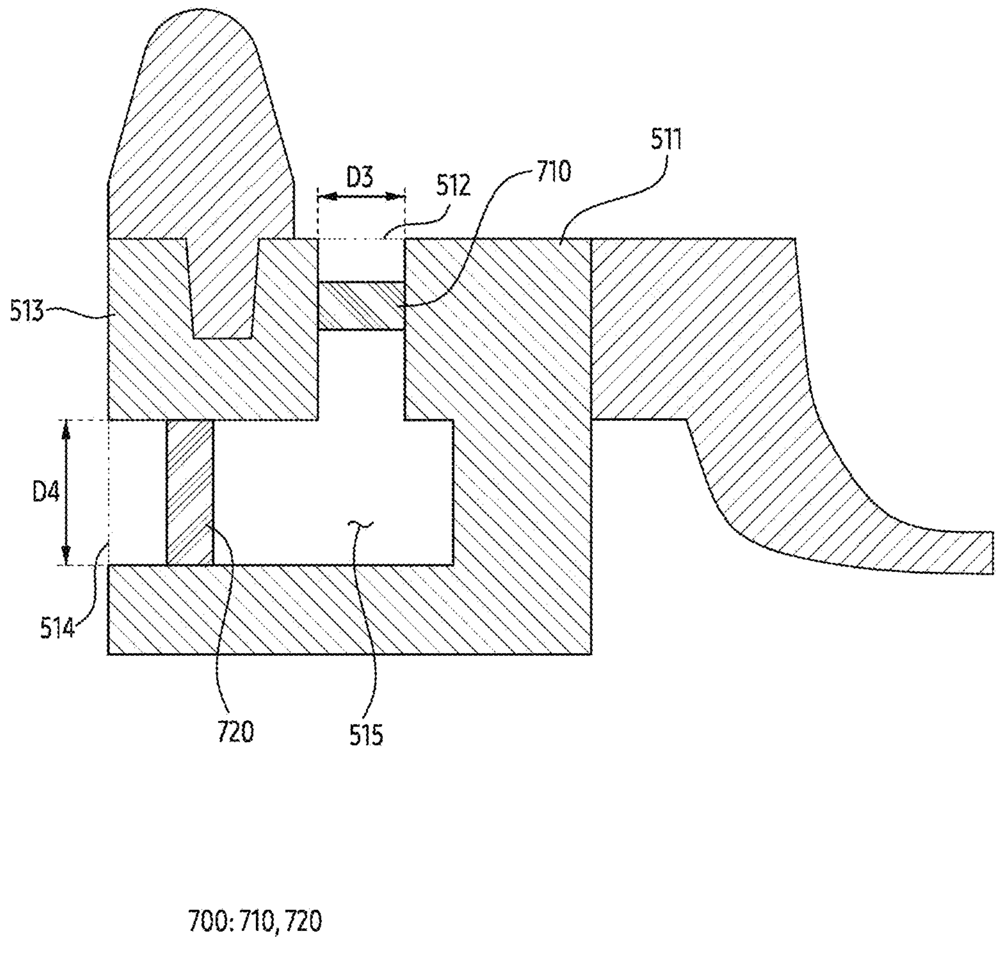
FIG. 14 illustrates an example of a section view of an example electronic device cut along line D-D' of FIG. 13, according to various embodiments.

FIG. 13 illustrates a portion of a perspective view of an example electronic device according to various embodiments. FIG. 14 illustrates an example of a section view of an example electronic device cut along line D-D' of FIG. 13, according to various embodiments.

Referring to FIGS. 13 and 14, according to an embodiment, in a frame 510, a first surface 511 on which at least one first opening 512 is formed may perpendicularly contact a second surface 513 on which at least one second opening 514 is formed. The at least one first opening 512 and the at least one second opening 514 may have different shapes. For example, a shape of the at least one first opening 512 may be circular, and a shape of the at least one second opening 514 connected to the at least one first opening 512 may be rectangular. A cross-sectional area of the at least one first opening 512 and a cross-sectional area of the at least one second opening 514 may be different from each other. A difference between the cross-sectional area of the at least one first opening 512 and the cross-sectional area of the at least one second opening 514 may cause a difference in ventilation amount. For example, a diameter D3 of the at least one first opening 512 may be smaller than a diameter D4 of the at least one second opening 514 connected to the at least one first opening 512. Since the at least one first opening 512 and the at least one second opening 514 are different from each other, a venturi effect may be caused. When air flowing from the first opening 512 and passing through the second opening 514 flows into the internal space, since a speed of air is reduced by the venturi effect, damage to electronic components disposed in the internal space may be prevented or reduced. When air introduced from the second opening 514 and passed through the first opening 512 flows into the audio duct 600, since a speed of air is increased by the venturi effect, a balance between the internal space pressure and the external pressure may be achieved quickly.

According to an embodiment, the flow path 515 may be a shape according to an arrangement of the first surface 511 and the second surface 513. According to an embodiment, the flow path 515 may connect at least one first opening 512 formed on the first surface 511 and at least one second opening 514 formed on the second surface 513 perpendicularly contacting the first surface 511. Referring to FIG. 14, the flow path 515 may extend from the first opening 512 by a predetermined length, be bent toward the second opening 514, and then extend to at least one second opening 514. According to an embodiment, since the flow path 515 is bent, even when a liquid flows into the housing 410, inflow into the internal space may be blocked.

According to an embodiment, the flow path 515 may be separated from the inside of the frame 510. The separation of the flow path 515 from the inside of the frame 510 may refer to, for example, the air flowing the flow path 515 not flowing into the frame 510. Air introduced from the outside may be introduced into the internal space by bypassing the frame 510 through the flow path 515.

Referring to FIG. 14, according to an embodiment, the electronic device 400 may include a waterproof membrane 700 disposed in the flow path 515. Since the waterproof membrane 700 is disposed in the flow path 515, liquid transferred through the audio duct 600 from the outside of the housing 410 may be prevented from flowing into the internal space.

According to an embodiment, the waterproof membrane 700 may correspond to the diameter D3 of the at least one first opening 512 and the diameter D4 of the at least one second opening 514. The waterproof membrane 700 may shield the at least one first opening 512 and/or the at least one second opening 514. The waterproof membrane 700 may be disposed in the at least one first opening 512 and/or the at least one second opening 514.

For example, the waterproof membrane 700 may be disposed in the at least one first opening 512 and the at least one second opening 514. For example, the waterproof membrane 700 may include a first waterproof membrane 710 adjacent to the at least one first opening 512 and a second waterproof membrane 720 adjacent to the at least one second opening 514. In order to prevent or reduce the inflow of liquid from the audio duct 600 to the at least one first opening 512, a length of the first waterproof membrane 710 disposed on the at least one first opening 512 may correspond to the diameter D3 of the at least one first opening 512. In order to prevent or reduce the inflow of liquid introduced to the flow path 515 to the internal space, a length of the second waterproof membrane 720 disposed on the at least one second opening 514 may correspond to the diameter D4 of the at least one second opening 514. The waterproof membrane 700 may shield the at least one first opening 512 and the at least one second opening 514.

For another example, referring to FIG. 13, according to an embodiment, the electronic device 400 may include the waterproof membrane 700 extending along a periphery of the frame 510. According to an embodiment, the waterproof membrane 700 may prevent or reduce the inflow of liquid by extending along a periphery of the frame 510 inside the frame 510. The waterproof membrane 700 may be provided inside the frame 510 by double injection.

A typical electronic device may include a waterproof membrane in a vent hole to prevent the inflow of liquid into the internal space. When performing a pneumatic test of the electronic device, since damage to the waterproof membrane may occur, a separate member for preventing damage to the waterproof membrane 700 may be required.

According to an embodiment, since the electronic device 400 includes the waterproof membrane 700 disposed in the flow path 515 of the frame 510, damage to the waterproof membrane 700 provided in the vent hole may not occur when performing the pneumatic test. According to an embodiment, since the electronic device 400 does not require a separate member for damaging the waterproof membrane 700 when performing the pneumatic test, the pneumatic test may be simplified.

According to an embodiment, a wearable device (e.g., the electronic device 400 of FIG. 4) may comprise a housing (e.g., housing 410 of FIG. 4) including a speaker hole (e.g., the speaker hole 417 of FIG. 4) and forming an internal space, a speaker assembly (e.g., the speaker assembly 500 of FIG. 5) disposed in the housing, and an audio duct (e.g., the audio duct 600 of FIG. 6) extending from an inner surface of the housing, where the speaker hole is formed, to the speaker assembly, wherein the speaker assembly may include a frame (e.g., the frame 510 of FIG. 6) including at least one first opening (e.g., at least one first opening 512 of FIG. 7) formed on a first surface (e.g., the first surface 511 of FIG. 6) of surfaces of the speaker assembly, the first surface facing the audio duct, at least one second opening (e.g., at least one second opening 514 of FIG. 8C) formed on a second surface (e.g., the second surface 513 of FIG. 6), and a flow path (e.g., the flow path 515 of FIG. 9) connecting the at least one first opening and the at least one second opening, a sealing member (e.g., the sealing member 520 of FIG. 6) disposed along a periphery of the frame and sealing the internal space, and a diaphragm (e.g., the diaphragm 540 of FIG. 8A) disposed within the frame and in contact with a portion of the sealing member.

According to an embodiment, the sealing member may separate the audio duct from an inside of the frame.

According to an embodiment, the flow path may connect the audio duct and the internal space so that air flows between the audio duct and the internal space.

According to an embodiment, the at least one first opening may be formed at a corner of the first surface, and the at least one second opening may face the at least one first opening.

According to an embodiment, the sealing member may include a first area (e.g., the first area 521 of FIG. 8A) disposed on the diaphragm and vibrating based on vibration of the diaphragm, and a second area (e.g., the second area 522 of FIG. 8A) distinct from the first area.

According to an embodiment, the second area of the sealing member may expose the at least one first opening to the first surface on which the at least one first opening is formed.

According to an embodiment, the second surface on which the at least one second opening is formed may perpendicularly contact the first surface on which the at least one first opening is formed, and the flow path may be separated from an inside of the frame.

According to an embodiment, the flow path may extend from the at least one first opening, bends, and then extends to the at least one second opening.

According to an embodiment, the wearable device may further include a waterproof membrane (e.g., the waterproof membrane 700 of FIG. 11) disposed in the flow path to reduce inflow of liquid from an outside of the housing through the audio duct from flowing into the internal space.

According to an embodiment, the at least one first opening may have a cross-sectional area different from a cross-sectional area of the at least one second opening.

According to an embodiment, the at least one first opening, the at least one second opening, and the flow path may be plural, and each of one or more of the plurality of flow paths may have a different cross-sectional area.

According to an embodiment, the wearable device may further include a supporting portion (e.g., supporting portion 800 of FIG. 12) including a through hole (e.g., through hole

810 of FIG. 12) connecting the flow path and the internal space, and a waterproof membrane disposed between the supporting portion and the frame to reduce inflow of liquid from the internal space through the flow path.

According to an embodiment, a wearable device (e.g., the electronic device 400 of FIG. 4) may include a display (e.g., the display 412 of FIG. 4), a rear plate (e.g., the rear plate 416 of FIG. 4) facing the display, a side bezel member (e.g., the side bezel member 414 of FIG. 4) disposed between the display and the rear plate and forming an internal space, a speaker hole (e.g., the speaker hole 417 of FIG. 4) penetrating from an outer surface of the rear plate into the internal space, a speaker assembly (e.g., the speaker assembly 500 of FIG. 5) disposed in the internal space, and an audio duct (e.g., the audio duct 600 of FIG. 6) penetrating a partition wall (e.g., the partition wall 419 of FIG. 5) formed on the rear plate, and extending from the outer surface of the rear plate, where the speaker hole is formed, to the speaker assembly, wherein the speaker assembly may include a frame (e.g., the frame 510 of FIG. 6) including at least one first opening (e.g., at least one first opening 512 of FIG. 7) formed on a first surface (e.g., the first surface 511 of FIG. 6) of surfaces of the speaker assembly, the first surface facing the audio duct, at least one second opening (e.g., at least one second opening 514 of FIG. 8C) formed on a second surface (e.g., the second surface 513 of FIG. 6), and a flow path (e.g., the flow path 515 of FIG. 9) connecting the at least one first opening and the at least one second opening, a sealing member (e.g., the sealing member 520 of FIG. 6) disposed along a periphery of the frame and sealing the internal space, a diaphragm (e.g., the diaphragm 540 of FIG. 8A) disposed within the frame and in contact with a portion of the sealing member, and at least one voice coil (e.g., the voice coil 503 of FIG. 10) providing vibration to the diaphragm.

According to an embodiment, the speaker assembly may be fixed to the partition wall.

According to an embodiment, the frame may separate the audio duct from the internal space.

According to an embodiment, the flow path may connect the audio duct and the internal space so that air flows between the audio duct and the internal space.

According to an embodiment, the at least one first opening may be formed at a corner of the first surface, and the at least one second opening may face the at least one first opening.

According to an embodiment, the sealing member may include a first area (e.g., the first area 521 of FIG. 8A) disposed on the diaphragm and vibrating based on vibration of the diaphragm, and a second area (e.g., the second area 522 of FIG. 8A) distinct from the first area, and the second area of the sealing member may expose the at least one first opening to the first surface on which the at least one first opening is formed.

According to an embodiment, the second surface on which the at least one second opening is formed may perpendicularly contact the first surface on which the at least one first opening is formed, and the flow path may be separated from an inside of the frame.

According to an embodiment, the wearable device may further comprise a waterproof membrane (e.g., the waterproof membrane 700 of FIG. 11) disposed in the flow path to reduce inflow of liquid from an outside of the wearable device through the audio duct from flowing into the internal space.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," or "connected with" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply refers to the storage medium being a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A wearable device comprising:
a housing defining a speaker hole; and
a speaker assembly disposed in the housing,
the speaker assembly including:
a diaphragm, wherein the housing defines an audio duct providing a path for audio sound from the diaphragm to the speaker hole,
a frame supporting the diaphragm and defining at least one through hole connecting an internal volume of the housing to the audio duct to allow airflow for ventilation of the internal volume of the housing via the audio duct and the speaker hole, which provide the audio sound, and
a sealing member coupled to a periphery of the frame to seal a gap between the housing and the speaker assembly.

2. The wearable device of claim 1,
wherein the sealing member separates the audio duct from an inside of the frame.

3. The wearable device of claim 1,
wherein air flows between an exterior of the housing and the internal volume of the housing via the at least one through hole of the frame, the audio duct, and the speaker hole, to balance internal volume pressure and external pressure.

4. The wearable device of claim 1,
wherein the at least one through hole of the frame extends from at least one first opening formed on a first surface of the frame facing the audio duct to at least one second opening formed on a second surface of the frame opposite to the first surface of the frame,
wherein the at least one first opening is formed at a corner of the first surface, and
wherein the at least one second opening faces the at least one first opening.

5. The wearable device of claim 4,
wherein the sealing member includes:
a first area disposed on the diaphragm and configured to vibrate based on vibration of the diaphragm, and
a second area distinct from the first area.

6. The wearable device of claim 5,
wherein the second area of the sealing member exposes the at least one first opening to the first surface on which the at least one first opening is formed.

7. The wearable device of claim 4,
wherein the second surface on which the at least one second opening is formed perpendicularly contacts the first surface on which the at least one first opening is formed, and
wherein the through hole is separated from an inside of the frame.

8. The wearable device of claim 4,
wherein at least a portion of the through hole is bent between the at least one first opening and the at least one second opening.

9. The wearable device of claim 1, further comprising a waterproof membrane disposed in the flow-path through hole to reduce inflow of liquid from an outside of the housing through the audio duct from flowing into the internal volume.

10. The wearable device of claim 4,
wherein the at least one first opening has a cross-sectional area different from a cross-sectional area of the at least one second opening.

11. The wearable device of claim 1,
wherein the at least one through hole includes a plurality of through holes having a different cross-sectional area.

12. The wearable device of claim 1, further comprising:
a support defining another through hole connecting the through hole of the frame and the internal volume; and
a waterproof membrane disposed between the support and the frame to reduce inflow of liquid from the internal volume through the through hole of the frame.

13. A wearable device comprising:
a display defining at least a portion of a front side of the wearable device;
a rear plate opposite to the display, the rear plate defining a speaker hole;
a side bezel disposed between the display and the rear plate, wherein an internal volume is defined by the display, the rear plate, and the side bezel; and
a speaker assembly disposed in the internal volume,
wherein the wearable device defines an audio duct, passing through a partition wall formed on the rear plate, providing a path for audio sound from the speaker assembly to the speaker hole,
wherein the speaker assembly includes:
a frame including at least one first opening formed on a first surface of surfaces of the speaker assembly, the first surface facing the audio duct, at least one second opening formed on a second surface of the surfaces, and a flow path connecting the at least one first opening and the at least one second opening, a sealing member disposed along a periphery of the frame and sealing the internal volume, a diaphragm disposed within the frame and in contact with a portion of the sealing member, and at least one voice coil configured to vibrate the diaphragm, wherein the at least one first opening is in communication with the audio duct and the at least one second opening is in communication with the internal volume, such that air flows between an exterior of the wearable device and the internal volume through the speaker hole and the audio duct.

14. The wearable device of claim 13, wherein the speaker assembly is fixed to the partition wall.

15. The wearable device of claim 13, wherein the frame separates the audio duct from the internal volume.

16. The wearable device of claim 13, wherein the flow path connects the audio duct and the internal volume so that air flows between the audio duct and the internal volume.

17. The wearable device of claim 13, wherein the at least one first opening is formed at a corner of the first surface, and wherein the at least one second opening faces the at least one first opening.

18. The wearable device of claim 17, wherein the sealing member includes:

a first area disposed on the diaphragm and configured to vibrate based on vibration of the diaphragm, and a second area distinct from the first area, and wherein the second area of the sealing member exposes the at least one first opening to the first surface on which the at least one first opening is formed.

19. The wearable device of claim 13, wherein the second surface on which the at least one second opening is formed perpendicularly contacts the first surface on which the at least one first opening is formed, and wherein the flow path is separated from an inside of the frame.

20. The wearable device of claim 13, further comprising a waterproof membrane disposed in the flow path to reduce inflow of liquid from an outside of the wearable device through the audio duct from flowing into the internal volume.

* * * * *